(12) United States Patent
Kim et al.

(10) Patent No.: US 10,271,241 B2
(45) Date of Patent: Apr. 23, 2019

(54) METHOD AND DEVICE FOR TRANSMITTING AND RECEIVING DATA PACKETS IN WIRELESS COMMUNICATION SYSTEM

(71) Applicant: Samsung Electronics Co., Ltd, Gyeonggi-do (KR)

(72) Inventors: Sukwon Kim, Gyeonggi-do (KR); Hyunjeong Kang, Seoul (KR); Jungsoo Jung, Gyeonggi-do (KR); Sangwook Kwon, Gyeonggi-do (KR); June Hwang, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 52 days.

(21) Appl. No.: 14/913,963

(22) PCT Filed: Aug. 21, 2014

(86) PCT No.: PCT/KR2014/007797
§ 371 (c)(1),
(2) Date: Feb. 23, 2016

(87) PCT Pub. No.: WO2015/026186
PCT Pub. Date: Feb. 26, 2015

(65) Prior Publication Data
US 2016/0205586 A1    Jul. 14, 2016

(30) Foreign Application Priority Data
Aug. 23, 2013  (KR) .......................... 10-2013-0100494

(51) Int. Cl.
*H04W 28/06*   (2009.01)
*H04L 1/00*    (2006.01)
*H04L 1/16*    (2006.01)

(52) U.S. Cl.
CPC ............ *H04W 28/06* (2013.01); *H04L 1/0011* (2013.01); *H04L 1/16* (2013.01); *H04L 1/1607* (2013.01);
(Continued)

(58) Field of Classification Search
CPC ........ H04N 19/61; H04N 19/70; H04N 19/46; H04W 28/06; H04L 1/16; H04L 1/0011;
(Continued)

(56) References Cited

U.S. PATENT DOCUMENTS 6,557,042 B1 *  4/2003  He ..................... G06F 17/30017
                                                  707/999.001
9,088,888 B2 *  7/2015  Duan .................. H04L 63/0428
(Continued)

OTHER PUBLICATIONS

International Search Report dated Dec. 19, 2014 in connection with International Patent Application No. PCT/KR2014/007797, 8 pages.
(Continued)

*Primary Examiner* — Will W Lin

(57) ABSTRACT

A method by which a proxy server of a wireless communication system transmits and receives packets, according to one embodiment of the present specification, comprises the steps of: receiving a data request from a terminal; receiving a packet corresponding to the data request from a data server; receiving feedback related to a transmission state from a network entity comprising a base station and/or an access point (AP); determining a redundancy rate on the basis of the feedback; encoding the received packet on the basis of the determined redundancy rate; and transmitting the encoded packet to the network entity. According to the embodiment of the present description, limited wired and wireless resources can be efficiently used, and loads to be applied to the base station or the AP can be efficiently controlled.

20 Claims, 21 Drawing Sheets

(52) U.S. Cl.
CPC .... *H04L 1/0076* (2013.01); *H04L 2001/0097* (2013.01)

(58) Field of Classification Search
CPC ................ H04L 1/1607; H04L 1/0076; H04L 2001/0097
USPC ........................................ 370/252, 413, 230
See application file for complete search history.

(56) References Cited

U.S. PATENT DOCUMENTS

| | | |
|---|---|---|
| 2009/0323646 A1 | 12/2009 | Ketchum et al. |
| 2010/0260180 A1 | 10/2010 | Wu et al. |
| 2010/0328528 A1* | 12/2010 | Eggert ................ H03M 13/356 348/425.2 |
| 2012/0011413 A1* | 1/2012 | Liu ...................... H04L 1/0009 714/746 |
| 2012/0192031 A1* | 7/2012 | Liu ........................ H04L 1/007 714/752 |
| 2012/0314655 A1* | 12/2012 | Xue ..................... H04L 1/0076 370/328 |
| 2012/0331160 A1 | 12/2012 | Tremblay et al. |
| 2013/0077501 A1* | 3/2013 | Krishnaswamy ..... H04L 47/193 370/252 |
| 2014/0153637 A1* | 6/2014 | Imai ...................... H04N 19/67 375/240.02 |

OTHER PUBLICATIONS

Written Opinion of the International Searching Authority dated Dec. 19, 2014 in connection with International Patent Application No. PCT/KR2014/007797, 9 pages.

\* cited by examiner

METHOD AND DEVICE FOR TRANSMITTING AND RECEIVING DATA PACKETS IN WIRELESS COMMUNICATION SYSTEM

CROSS-REFERENCE TO RELATED APPLICATION(S)

The present application claims priority under 35 U.S.C. § 365 to International Patent Application No. PCT/KR2014/007797 filed Aug. 21, 2014, entitled "METHOD AND DEVICE FOR TRANSMITTING AND RECEIVING DATA PACKETS IN WIRELESS COMMUNICATION SYSTEM", and, through International Patent Application No. PCT/KR2014/007797, to Korean Patent Application No. 10-2013-0100494 filed Aug. 23, 2013, each of which are incorporated herein by reference into the present disclosure as if fully set forth herein.

TECHNICAL FIELD

The present invention relates to a method and apparatus for transmitting/receiving data packets in wireless communication systems.

BACKGROUND ART

In recent years, as mobile terminals (user equipment), which include a number of wireless interfaces for 3G communication, Wi-Fi communication, etc., have increased, Multipath Transmission Control Protocol (MPTCP) for UE to recognize and use a number of network links in Transport Layer has increased in importance.

The MPTCP refers to a technology that allows a Transmission Control Protocol (TCP) session to use multiple paths, thereby increasing the reliability and the TCP throughput due to diversity, compared with an existing single path TCP.

FIG. 1 illustrates diagrams showing a method of transmitting/receiving data based on an MPTCP in a conventional wireless communication system.

As shown in diagram (a) of FIG. 1, the transmitter 100 is capable of transmitting data packets to the receiver 120 via a number of paths. More specifically, the transmitter 100 is capable of transmitting: "9, 8, 6, and 4" of the data packets "9, 8, 7, 6, 5, and 4" to the receiver 120 via one of the two paths, i.e., a first path 110; and "7 and 5" to the receiver 120 via the other path, i.e., a second path 120.

Alternatively, as shown in diagram (b) of FIG. 1, in order to prevent data packets from being lost during the transmission, the transmitter 100 may transmit the same data packets to the receiver 120 via the two paths 110 and 130. That is, the transmitter 100 transmits: data packets "7, 5, 9, 8, 6, and 4" to the receiver 120 via the first path 110; and the same as part of the data packets transmitted via the first path 110, e.g., "7 and 5", to the receiver 120 via the second path 130.

In this case, although the data packets transmitted via the second path 130 are lost, since the receiver 120 may receive the entire data packets via the first path 110, it can perform a successful data decoding process.

However, the wireless communication system using an MPTCP may have a problem of reduction of TCP throughput due to packet loss that may occur in individual paths. This is because the TCP window size is reduced by out-of-order data packets which are created due to loss of packets.

In addition, the wireless communication system using an MPTCP has paths that differ in quality from each other and this may cause transmission delay of data packets. Transmission delay of data packets causes latency in the data decoding process. Therefore, the data throughput is reduced.

In this case, although one or more of the packets in transmission or reception are not normally transmitted, in proportion to Packet Loss Rate (PLR) of UE, the technology may add redundancy to packet data in order to easily decode the packets received by UE and transmit/receive the packets. When transmitting/receiving data with a redundancy, although part of the packets are lost, the transmitted data may be successfully restored according to the redundancy value. When data packets are processed to contain a redundancy and transmission/reception of the signals is performed, the base station or Access Point (AP) may have a problem of increasing the load according to an encoding process for the addition of redundancy. In addition, in order to perform transmission/reception of data in response to different PLRs according to UE devices, radio resources of which amount is limited may be excessively used.

Therefore, a method and apparatus is required to solve these problems.

DISCLOSURE OF INVENTION

Technical Problem

The present invention has been made to address the above problems and disadvantages, and to provide at least the advantages described below. Accordingly, an aspect of the present invention provides a method and apparatus for transmitting/receiving data packets in wireless communication systems.

The present invention further provides a method and apparatus for applying an Adaptive Random Liner Coding Scheme to an MPTCP in wireless communication systems to resolve packet loss and delay problems.

Solution to Problem

In accordance with an aspect of the present invention, a method of transmitting/receiving packets in a proxy server of a wireless communication system is provided. The method includes: receiving a data request from a terminal; receiving a packet corresponding to the data request from a data server; receiving feedback related to a transmission status from a network entity comprising a base station and/or an access point (AP); determining a redundancy rate based on the feedback; encoding the received packet based on the determined redundancy rate; and transmitting the encoded packet to the network entity.

In accordance with another aspect of the present invention, a method of transmitting/receiving packets in a network entity including a base station and/or an access point in a wireless communication system is provided. The method includes: receiving, from a sever, a packet encoded based on a first redundancy rate; receiving channel status information from a terminal; encoding the received packet based on a second redundancy rate that is determined based on the channel status information and the first redundancy rate; and transmitting the packet, encoded based on the second redundancy, to the terminal.

In accordance with another aspect of the present invention, a method of transmitting/receiving packets in a terminal of a wireless communication system is provided. The method includes: transmitting channel status information to a network entity comprising an access point (AP) and/or a base station; and receiving a packet encoded by the AP or the base station, from the AP or the base station. The received packet is encoded in such a way that: a server encodes a packet based on a first redundancy rate and transmits the encoded packet to the network entity; the network entity encodes the packet on a second redundancy rate that is determined based on the channel status information and the first redundancy rate.

In accordance with another aspect of the present invention, a proxy server for transmitting/receiving packets in a wireless communication system is provided. The proxy server includes: a transceiver for transmitting/receiving a packet to/from at least one of the following: a base station, an access point (AP), a data server and a terminal; and a controller for: controlling the transceiver; receiving a data request from the terminal; receiving a packet corresponding to the data request from the data server; receiving feedback related to a transmission status from the base station and/or the AP; determining a redundancy rate based on the feedback; encoding the received packet based on the determined redundancy rate; and transmitting the encoded packet to the base station and/or the AP.

In accordance with another aspect of the present invention, a transmission and reception apparatus for transmitting/receiving packets in a wireless communication system is provided. The transmission and reception apparatus includes:

a transceiver for transmitting/receiving a packet to/from at least one of the following: a proxy server and a terminal; and a controller for: controlling the transceiver; receiving, from the proxy sever, a packet encoded based on a first redundancy rate; receiving channel status information from the terminal; encoding the received packet based on a second redundancy rate that is determined based on the channel status information and the first redundancy rate; and transmitting the packet, encoded based on the second redundancy, to the terminal.

In accordance with another aspect of the present invention, a terminal for transmitting/receiving packets in a wireless communication system is provided. The terminal includes: a transceiver for transmitting/receiving a packet to/from at least one of the following: a base station, an access point (AP), and a proxy server; and a controller for: controlling the transceiver; transmitting channel status information to the AP and/or the base station; and receiving a packet encoded by the AP and/or the base station, from the AP and/or the base station. The received packet is encoded in such a way that: the proxy server encodes a packet based on a first redundancy rate and transmits the encoded packet to the AP and/or the base station; the AP and/or the base station encodes the packet on a second redundancy rate that is determined based on the channel status information and the first redundancy rate.

Advantageous Effects of Invention

The embodiments of the present disclosure can resolve packet loss and delay problems in the wireless communication systems using an MPTCP. The present invention applies an Adaptive Random Liner Coding Scheme to an MPTCP, thereby preventing the reduction of TCP throughput and removing the receiving buffer blocking problem. In addition, the embodiments can increase the usage efficiency of limited wired and wireless resources and also efficiently control load of a base station or an AP.

MODE FOR INVENTION

Figure 1:
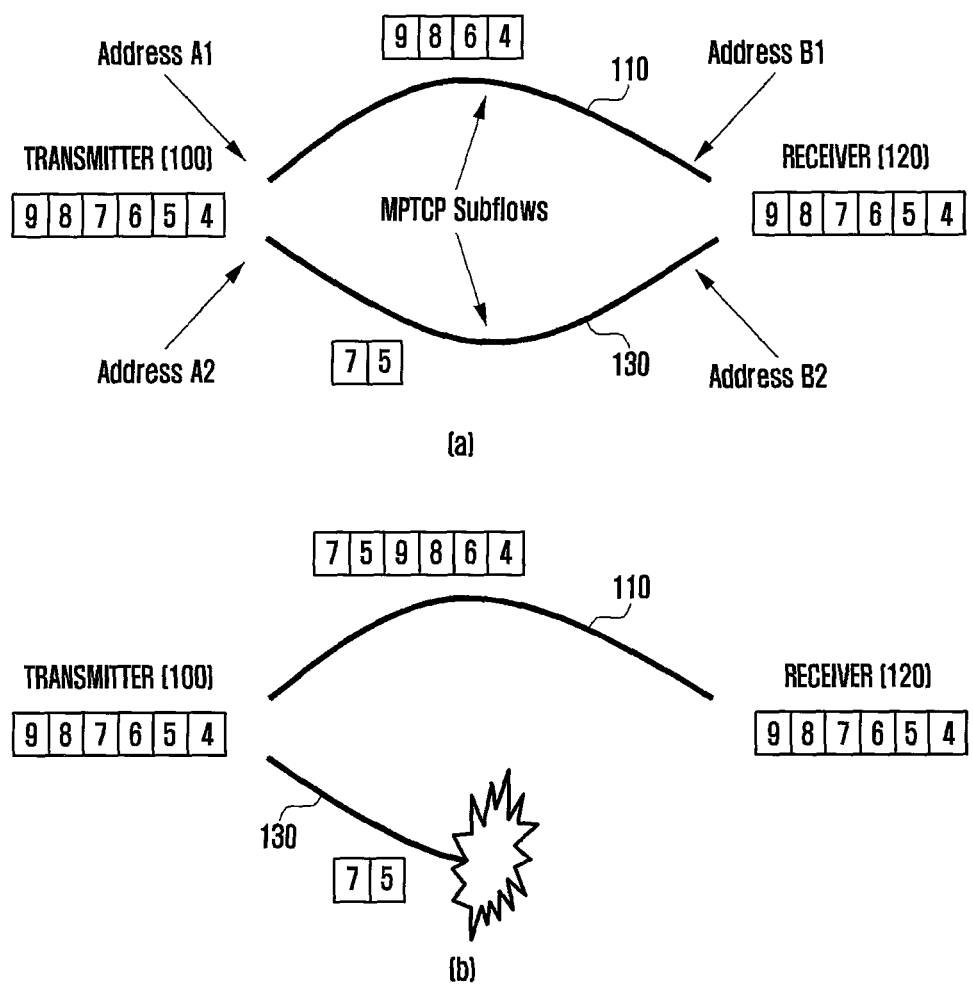
FIG. 1 illustrates diagrams showing a method of transmitting/receiving data based on an MPTCP in a conventional wireless communication system.

Hereinafter, the operations and principle of the invention are described in detail with reference to the accompanying drawings. Detailed descriptions of well-known functions and structures incorporated herein may be omitted to avoid obscuring the subject matter of the invention. The terms or words described in the description and the claims should not be limited by a general or lexical meaning, instead should be analyzed as a meaning and a concept through which the inventor defines and describes the invention at his most effort, to comply with the idea of the invention.

In describing embodiments, detailed description of known functions, configurations, and operations incorporated herein will be omitted when it may make the subject matter of the invention less clear.

Similarly, the drawings are not necessarily to scale and certain features may be exaggerated, omitted, or simplified in order to better illustrate and explain the invention. The same reference numbers are used throughout the drawings to refer to the same or similar parts.

In addition, it should be understood that blocks, processes, and a combination thereof in the flow diagrams can be performed via computer programming instructions. These computer programming instructions can be installed to processors of data processing equipment that can be programmed, special computers, or universal computers. The instructions, performed via the processors of data processing equipment or the computers, can generate means that perform functions described in blocks of the flow diagram. In order to implement functions in a particular mode, the computer programming instructions can also be stored in a computer available memory or computer readable memory that can support computers or data processing equipment that can be programmed. Therefore, the instructions, stored in the computer available memory or computer readable memory, can be installed to the products, and perform the functions therein, described in the blocks of the flow diagram therein. In addition, since the computer programming instructions can also be installed to computers or data processing equipment that can be programmed, they can create processes that perform a series of operations therein, described in the blocks of the flow diagram therein.

The blocks of the flow diagram refer to part of codes, segments or modules that include one or more executable instructions to perform one or more logic functions. It should be noted that the functions described in the blocks of the flow diagram may be performed in a different order from the embodiments described above. For example, the functions described in two adjacent blocks may be performed at the same time or in reverse order.

In the embodiments, the terminology, component '~unit,' refers to a software element or a hardware element such as a PGGA, an ASIC, etc., and performs a corresponding function. It should be, however, understood that the component '~unit' is not limited to a software or hardware element. The component '~unit' may be implemented in storage media that can be designated by addresses. The component '~unit' may also be configured to regenerate one or more processors. For example, the component '~unit' may include various types of elements (e.g., software elements, object-oriented software elements, class elements, task elements, etc.), segments (e.g., processes, functions, achieves, attribute, procedures, sub-routines, program codes, etc.), drivers, firmware, micro-codes, circuit, data, data base, data structures, tables, arrays, variables, etc. Functions provided by elements and the components '~units' may be formed by combining the small number of elements and components '~units' or may be divided into additional elements and components '~units.' In addition, elements and components '~units' may also be implemented to regenerate one or more CPUs in devices or security multi-cards.

The embodiments of the present disclosure provide a method and apparatus for transmission/reception of data in wireless communication systems. More specifically, the present invention provides a method and apparatus that enables a transmitter to: determine the number of first data packet to be transmitted to a receiver, based on the buffer status of the receiver; determine the number of second data packets identical to at least one of the determined number of first data packets, based on a packet loss rate for each of a number of paths; encode the determined number of first data packets and the determined number of second data packets; and to transmit the encoded data packets to the receiver via the respective paths.

The following embodiments of the present disclosure are described based on a wireless communication system using Multipath Transmission Control Protocol (MPTCP). An example of the wireless communication system using MPTCP is shown in FIG. 2.

Figure 2:
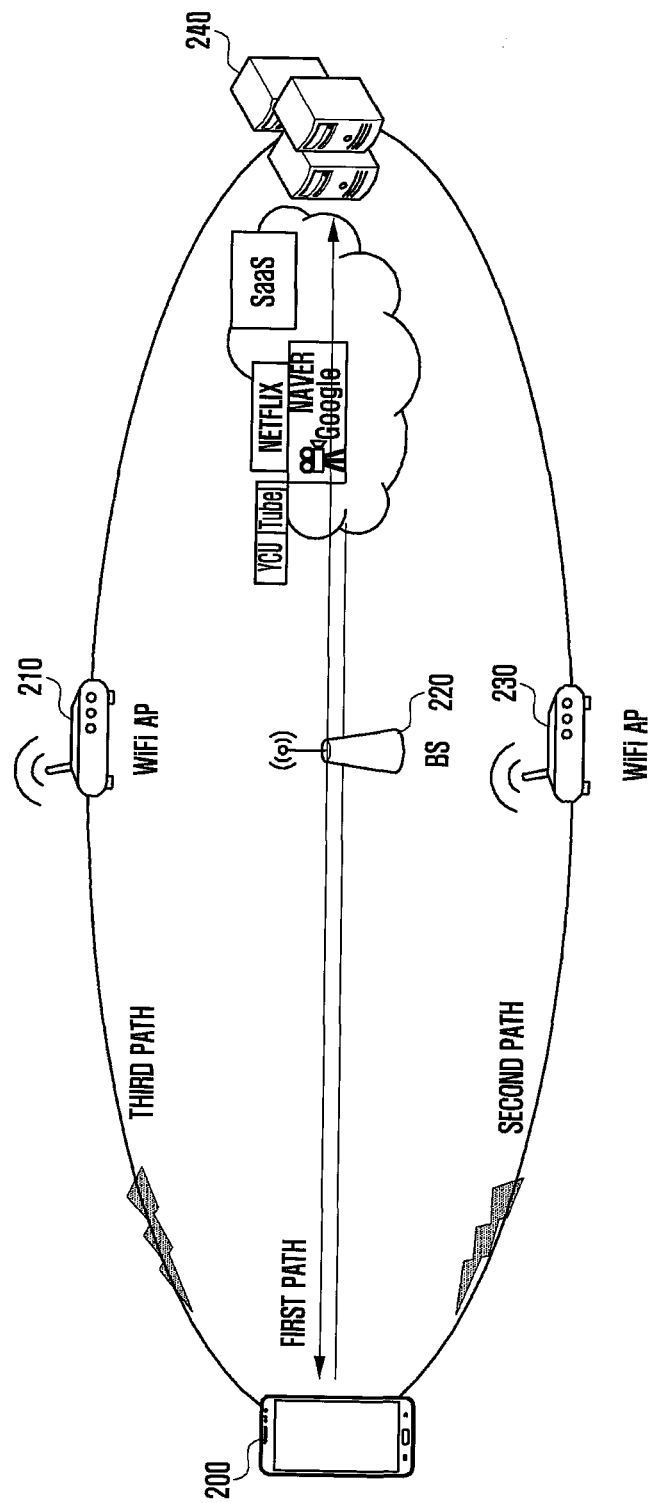
FIG. 2 is a diagram showing an example of a wireless communication system using an MPTCP.

FIG. 2 is a diagram showing an example of a wireless communication system using an MPTCP.

Referring to FIG. 2, the wireless communication system includes a terminal 200, first node 210, second node 220 and third node 230, such as access point (AP) and a base station (BS), etc., and a server 240 in the Internet. In the embodiment, the AP includes WIFI APs.

When the wireless communication system using MPTCP, the terminal 200 and the server 240 are capable of transmitting/receiving data via a number of paths created by the first to third nodes 210 to 230. When the wireless communication system uses a number of paths, it can increase the throughput and the reliability, compared with the existing single path TCP.

However, the wireless communication system does not consider packet loss, delay, etc., in the multipath when performing transmission/reception of data, and this may cause various problems. The detailed operation of the wireless communication system will be described as follows referring to FIGS. 3 and 4.

Figure 3:
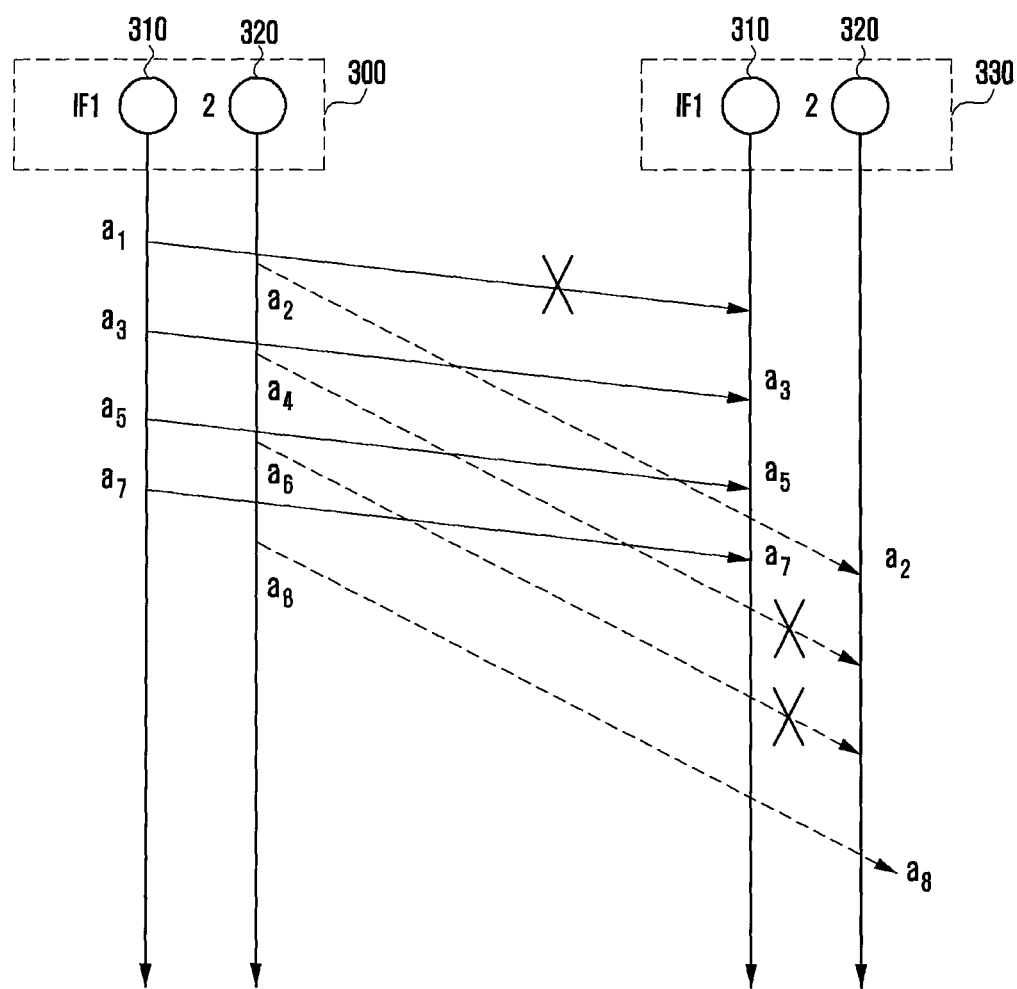
FIG. 3 is a diagram that describes a method of transmitting/receiving data based on an MPTCP in a wireless communication system.

FIG. 3 is a diagram that describes a method of transmitting/receiving data based on an MPTCP in a wireless communication system.

Referring to FIG. 3, the transmitter 300 and the receiver 330 communicate with each other using a first path 310 and a second path 320. The transmitter 300 transmits data packets "a1, a3, a5, a7" via the first path 310 and data packets "a2, a4, a6, a8" via the second path 320.

However, when packet loss occurs in the first path 310 and second path 320, out-of-order data packets are created in the receiver 330. Therefore, the receiver 330 cannot properly process data. For example, in a state where the receiver 330 does not receive a data packet "a1" via the first path 310 due to packet loss, although it receives data packets "a3, a5, a7", it cannot perform the data decoding. Similarly, when the receiver 330 does not receive "a4, a6" via the second path 320 due to packet loss, it cannot perform the data decoding.

Therefore, when packet loss occurs in a number of paths, the TCP window size is reduced and this causes the overall TCP throughput to decrease.

Figure 4:
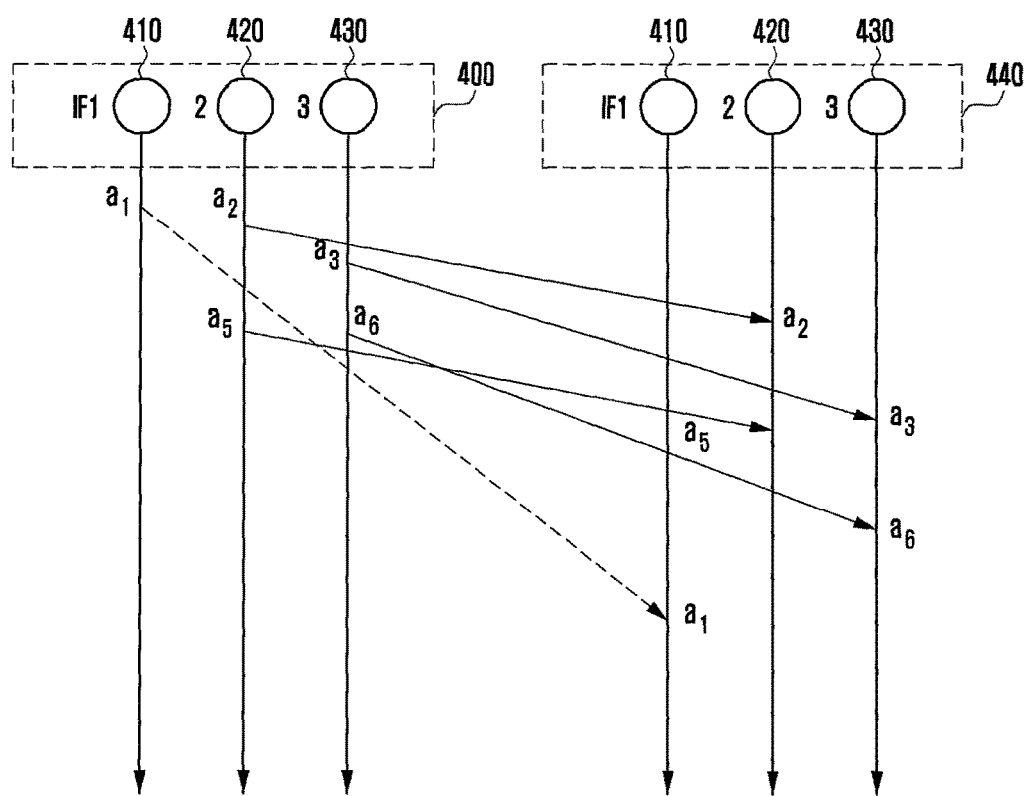
FIG. 4 a diagram that describes another method of transmitting/receiving data based on an MPTCP in a wireless communication system.

Meanwhile, employing MPTCP may also cause a Receiving Buffer Blocking as shown in FIG. 4. The Receiving Buffer Blocking may also arise as the receiving buffer is filled with out-of-order data packets and thus does not receive data packets.

FIG. 4 a diagram that describes another method of transmitting/receiving data based on an MPTCP in a general wireless communication system.

Referring to FIG. 4, the transmitter 400 and the receiver 440 communicate with each other using a first path 410, a second path 420 and a third path 430. The transmitter 400 transmits: data packets "a1" via the first path 410; data packets "a2, a5" via the second path 420; and data packets "a3, a6" via the third path 43.

Since the three paths have qualities that differ from each other, they also have variances of end-to-end delay, which means that their end-to-end delays differ from each other. TCP requires the receiver to receive packets in a precise order. However, when the receiver receives packets with a variance of delay, it needs to reorder the received packets. Reordering packets requires additional period of time, and this causes latency in the receiver.

In the embodiment of FIG. 4, when one of the three paths, e.g., the first path 410, has the lowest quality, the receiver 440 receives data packets "a2, a3, a5, a6" first via the second path 420 and third path 430, and the data packet "a1" latest via the first path 410. As described above, the order of packets is important to TCP. Therefore, when the receiver does not receive the data packet "a1", "a2, a3, a5, a6" are useless. In addition, although the receiver 440 has received data packets "a2, a3, a5, a6", it needs to wait until the data packet "a1" has been received. Therefore, when these processes are delayed, the overall performance is reduced.

In particular, when the receiver 440 has a small size of buffer for storing data packets, it may not receive corresponding data packets because the buffer is filled with out-of-order data packets. Therefore, the receiver 440 may not take an advantage of MPTCP capable of transmitting/receiving data at a high speed. Therefore, a system is required to perform transmission/reception of data packets using the characteristics of MPTCP without problems such as delay, low throughput, etc.

In the embodiment of the present invention, the wireless communication system using an MPTCP performs transmission/reception of data packets by employing an Adaptive Random Liner Coding (ARLC) scheme, thereby increasing the throughput and the reliability, without a delay problem and a low performance problem, caused due to packet loss.

The ARLC scheme refers to a method of encoding data packets to be transmitted by using Random Liner Network Coding (RLNC). The RLNC refers to a method of encoding data packets to be transmitted by applying liner encoding coefficients, and may be used for a particular network node in a wireless communication system, such as an intermediate node. An example of the intermediate node is a node between a terminal and a server of the Internet. The linear encoding coefficient may be randomly selected from a number of preset linear encoding coefficients.

The data packets encoded according to the RLNC are expressed by the following Equation 1.

$$\begin{pmatrix} y_1 \\ y_2 \\ \dots \\ y_n \end{pmatrix} = \begin{pmatrix} c_{1,1}, c_{1,2}, \dots, c_{1,m} \\ c_{2,1}, \dots c_{2,m} \\ \\ c_{n,1}, \dots c_{n,m} \end{pmatrix} \begin{pmatrix} x_1 \\ x_2 \\ \dots \\ x_m \end{pmatrix}$$ [Equation 1]

In the Equation 1, "$x_1, x_2, \dots, x_m$" denote data symbols forming data packets to be transmitted; "$c_{1,1}, c_{1,2}, \dots, c_{1,m}$", "$c_{2,1}, c_{2,2}, \dots, c_{2,m}$", and "$c_{n,1}, c_{n,2}, \dots, c_{n,m}$" denote linear encoding coefficients applied to the network codes respectively; and "$y_1, y_2, \dots, y_n$" denote encoded data symbols.

Meanwhile, Network Coding (NC) rank refers to the number of columns in an encoded matrix of encoded vectors stored in the receiver. For example, when the receiver receives "a+b+c", the NC rank is expressed by "rank (1, 1, 1)=1". In a state where the receiver has received "a+b+c", when it receives "a+2b+3c", the NC rank is expressed by the following equation:

$$\text{rank}\begin{pmatrix} 1, 1, 1 \\ 1, 2, 3 \end{pmatrix} = 2.$$

In this case, the NC rank is considered to be increased by one.

In the following description, embodiments are described in detail, considering the conditions described above.

Figure 5:
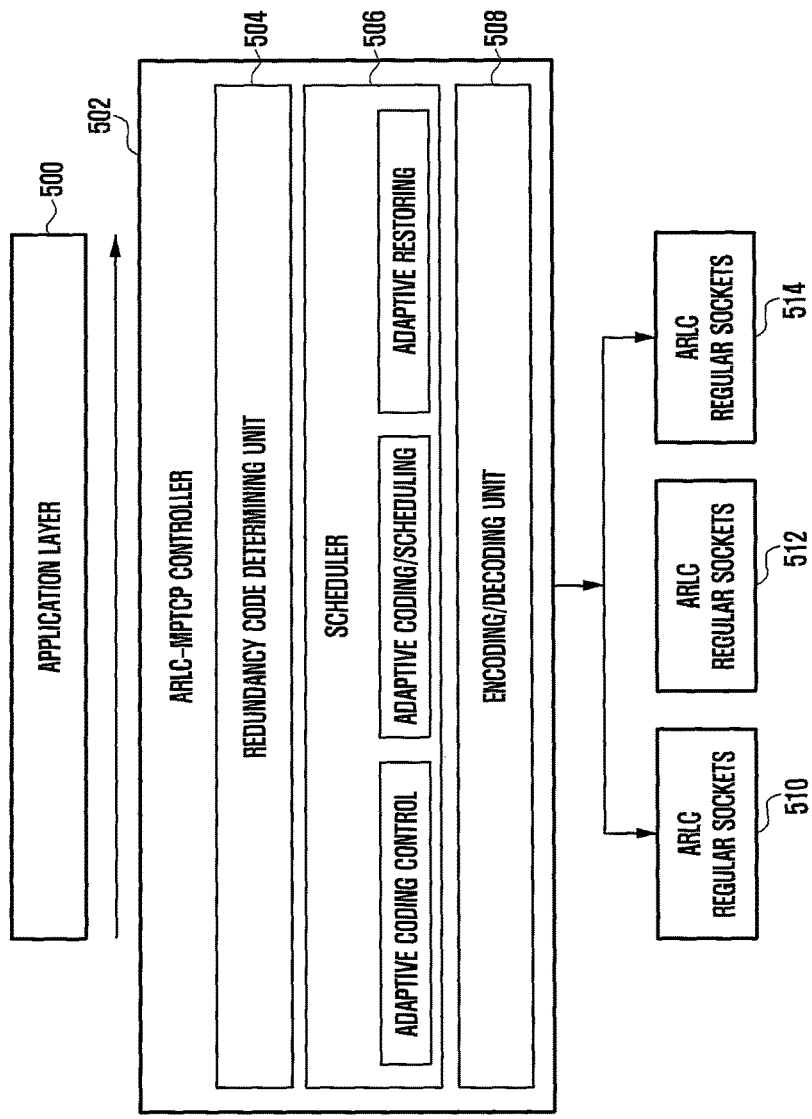
FIG. 5 is a block diagram showing an ARLC-MPTCP control device according to an embodiment of the present disclosure.

FIG. 5 is a block diagram showing an ARLC-MPTCP control device according to an embodiment of the present disclosure.

Referring to FIG. 5, the ARLC-MPTCP control device 550 is located in the lower layer of the Application Layer 500, i.e., an NC-MPTCP layer. The ARLC-MPTCP control device 550 interfaces the NC-MPTCP layer according to an embodiment of the present invention with other layers.

The ARLC-MPTCP control device 550 includes an ARLC-MPTCP controller 502, a redundancy code determining unit 504, a scheduler 506, an encoding/decoding unit 508 and a number of ARLC regular sockets 510, 512, and 514.

The ARLC-MPTCP controller 502 controls the redundancy code determining unit 504, the scheduler 506, the encoding/decoding unit 508 and the ARLC regular sockets 510, 512, and 514, thereby controlling the entire operation of the ARLC-MPTCP control device 550 (in particular, the operations of the transmitter according to an embodiment of the present invention).

The redundancy code determining unit 504 estimates the total packet loss rate of each of a number of paths, and determines a redundancy rate for determining the number of redundancy data packets to be additionally transmitted according to the estimated, total packet loss rate. The redundancy data packets refer to one or more duplicate data packets of the data packets to be transmitted. The total packet loss rate of each of a number of paths is estimated based on feedback received from the receiver or according to the number of responses (ACK or NACK) in response to the transmission of data packets, received from the receiver. According to embodiments, the redundancy data packets may be created to employ an error detection technique and an error correction technique. The error detection technique may include one or more of the following: a parity check, a block sum check, Cyclic Redundancy Check (CRC), and a checksum. The error correction technique may include one or more of the following: a single-bit error correction, a Hamming code and a convolutional code. According to embodiments, the redundancy data packets may also be created by using methods of duplicatively entering data in transmission so that, if data is lost during the transmission, the packets can be restored.

The scheduler 506 performs an Adaptive Batch size control operation, an Adaptive Coding/Scheduling operation and an adaptive restoring operation, based on the determined, redundancy data packets and the Round-Trip Times (RTTs) estimated according to a number of paths. Each RTT may be estimated, based on a time that a response signal (ACK, feedback signal, etc.) in response to the transmission of a data packet is received or based on RTT information included in the feedback received from the receiver.

The encoding/decoding unit 508 encodes data packets to be transmitted and decodes received data packets. The ARLC regular socket 510, 512 and 514 are used to communicate with the receiver via the paths.

In the following description, the Adaptive Batch size control operation, the Adaptive Coding/Scheduling operation and the adaptive restoring operation, performed by the scheduler 506, are described in detail.

(1) Adaptive Batch Size Control Operation

As described above, when the receiver has a small size of buffer for storing data packets, it may not receive corresponding data packets because the buffer is filled with out-of-order data packets. Therefore, the receiver may not take an advantage of MPTCP capable of transmitting/receiving data at a high speed.

In order to resolve the problem, the scheduler 506 performs an adaptive batch size control operation for determining the batch size, considering the buffer size of the receiver. The term batch refers to a unit of encoding data packets, and the batch size may be the number of data packets to be encoded at a time (that is, the number of data packets to be transmitted).

When the buffer size of the receiver is 40 and the batch size is 50, it is impossible for the receiver to receive and encode the entire, transmitted data packet. In addition, when the batch size is greater than the buffer size, the buffer error is less sensitive and the encoding/decoding process of the receiver increases in complexity.

Figure 6:
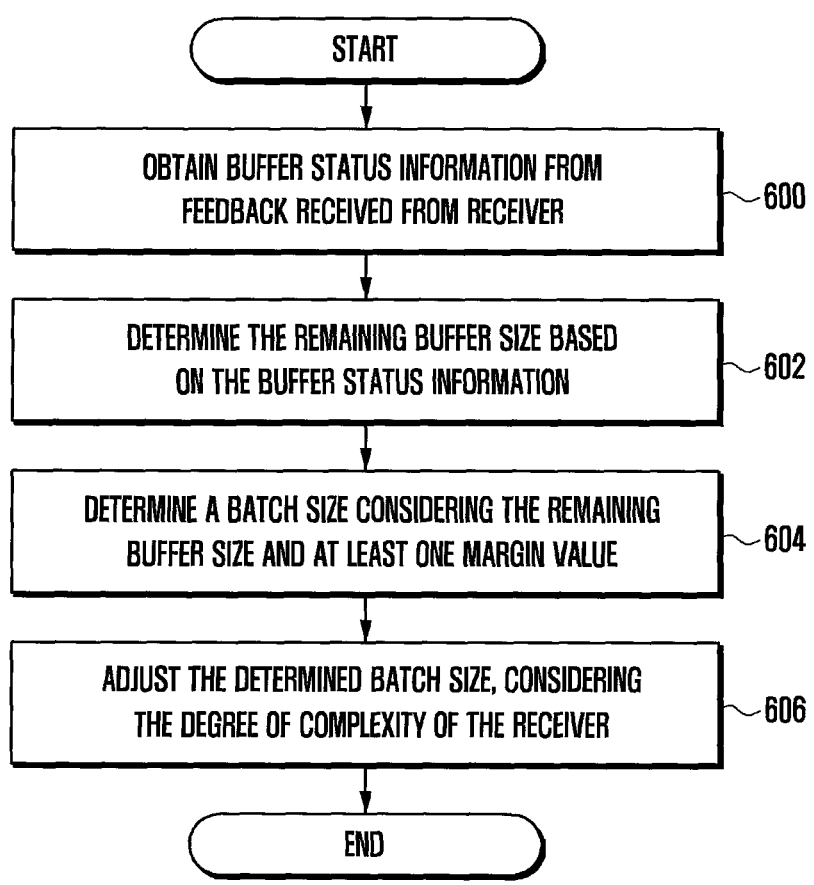
FIG. 6 is a flow diagram that describes an adaptive batch size controlling method according to an embodiment of the present disclosure.

Therefore, in order to resolve the problem, the embodiment of the present invention provides a method of efficiently determining the batch size as shown in FIG. 6.

FIG. 6 is a flow diagram that describes an adaptive batch size controlling method according to an embodiment of the present disclosure.

Referring to FIG. 6, the scheduler 506 obtains information regarding a buffer status of a receiver from the feedback received from the receiver in operation 600.

An example of the feedback is described as in the following table 1.

TABLE 1

| Batch # | Rank of received codewords | Buffer status | Measured RTT | Measured packet-loss rate of each flow | Successful decoding notification or NC-NACK |
| --- | --- | --- | --- | --- | --- |

In table 1, "Batch #" denotes the batch number; "Rank of received codewords" denotes rank information regarding a received data packet; "Buffer status" indicates a buffer status of the receiver; "Measured RTT" denotes an RTT measured at the receiver; "Measured packet-loss rate of each flow" denotes each of the packet loss rates for a number of paths, measured at the receiver; and the "Successful decoding notification or NC-NACK" is information indicating that the receiver has successfully decoded data packets in the batch unit or an NC-NACK indicating that the receiver has not received a specific data packet.

When the receiver has successfully decoded data packets every batch or has not received data packets, the feedback may be received.

When obtaining the buffer status information from the feedback in operation 600, the scheduler 506 determines the remaining buffer size of the receiver based on the buffer status information in operation 602. The scheduler 506 determines a buffer size available for the receiver, considering the remaining buffer size and at least one margin value, and determines a batch size based on the determined buffer size in operation 604.

An example of at least one margin value is descried as in the following table 2, including three types of items ①~②.

TABLE 2

↑
Batch
↓

① a buffer margin value considering a case that an estimated packet loss rate differs from a real packet loss rate
② a buffer margin value considering a packet re-transmitted according to an NC-NACK created because an estimated arrival time of a packet differs from a real arrival time of a packet
③ a buffer margin value considering a packet to be transmitted while the receiver performs a decoding operation
An area where current data is stored Referring to table 2, the batch size is determined by subtracting the area where data is stored and the area for at least one of the buffer margin values in items ①~③ from the buffer area of the receiver.

When at least one margin value includes the margin values in items ② and ③ and the sum of the margin values in items ② and ③ is greater than the overall buffer size, the margin value in item ② may be adjusted to be minimized as the redundancy data packets increases without considering the margin value in item ③.

When the batch size is determined in operation 604, the scheduler 506 adjusts the determined batch size, considering the degree of complexity of the receiver in operation 606. The degree of complexity of the receiver may be determined, based on the decoding performance of the receiver (e.g., the amount of data that the receiver can decode or the size of decoding matrix that the receiver can process). The information regarding the decoding performance of the receiver may be received from the receiver when the initial setting is set.

(2) Adaptive Coding/Scheduling Operation

The adaptive coding/scheduling operation may be performed after the adaptive batch size control operation is performed. That is, the adaptive coding/scheduling operation may be performed after the batch size is determined.

Figure 7:
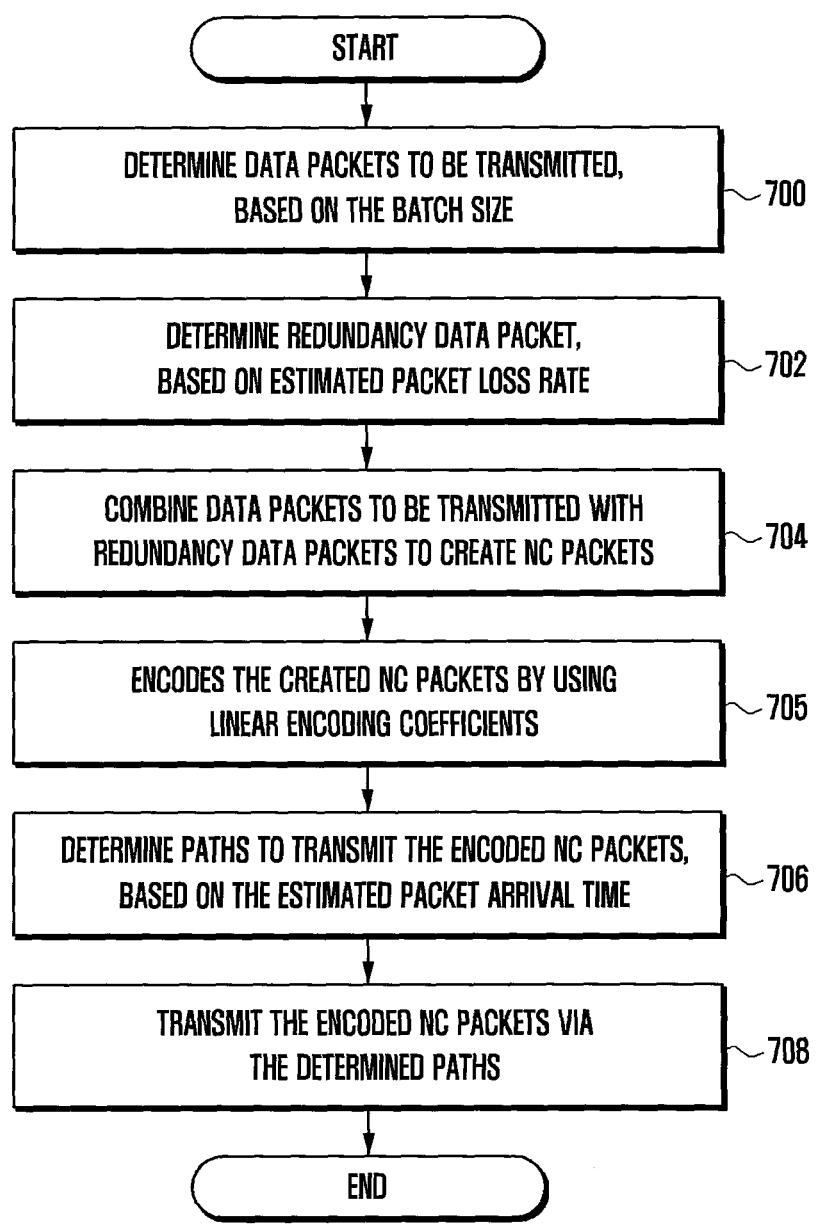
FIG. 7 is a flow diagram that describes a method of adaptive coding/scheduling operation according to an embodiment of the present disclosure.

FIG. 7 is a flow diagram that describes a method of adaptive coding/scheduling operation according to an embodiment of the present disclosure.

Referring to FIG. 7, the scheduler 506 determines data packets to be transmitted, based on the batch size in operation 700. That is, the scheduler 506 determines the number of data packets to be transmitted, corresponding to the batch size.

After that, the scheduler 506 determines the redundancy data packets, based on the packet loss rate for each of a number of estimated paths in operation 702. The scheduler 506 combines the data packets to be transmitted with the redundancy data packets to create NC packets in operation 704.

When the buffer size of the receiver and the batch size are 100 and 20 respectively and the redundancy rate is 10%, 20 data packets corresponding to the batch size and two redundancy data packets are added with each other, thereby creating 22 NC packets (20×(1+0.1)=22).

The scheduler 506 encodes the created NC packets by using linear encoding coefficients randomly selected from among a number of linear encoding coefficients in operation 705. The scheduler 506 determines paths to transmit the encoded NC packets, based on the estimated packet arrival time in operation 706. The scheduler 506 transmits the encoded NC packets via the determined paths in operation 708.

The Adaptive Coding/Scheduling operation is performed to determine the redundancy data packets through the estimation of a precise packet-loss rate. The Adaptive Coding/Scheduling operation is performed by periodically applying a varying packet loss rate to the time-varying network environment in a unit of batch.

(3) Adaptive Restoration Operation

When an error greater than the estimated packet loss rate occurs, the receiver creates an NC-NACK to request the transmitter to re-transmit a corresponding number of NC packets. The NC packets to be re-transmitted need to be transmitted to the receiver via a path that has the least packet loss rate and the shortest delay. To this end, the embodiment of the present invention needs to perform the adaptive restoring operation as follows.

Figure 8:
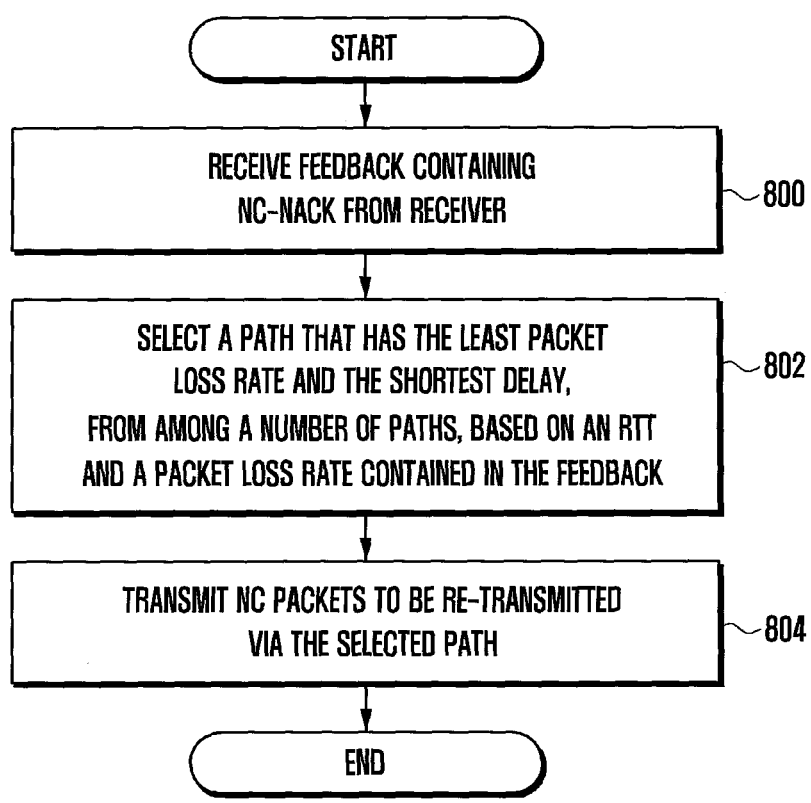
FIG. 8 is a flow diagram that describes a method of performing an adaptive restoring operation according to an embodiment of the present disclosure.

FIG. 8 is a flow diagram that describes a method of performing an adaptive restoring operation according to an embodiment of the present disclosure.

Referring to FIG. 8, the scheduler 506 receives the feedback containing an NC-NACK from the receiver in operation 800. The scheduler 506 selects a path that has the least packet loss rate and the shortest delay, from among a number of paths, based on an RTT and a packet loss rate contained in the feedback in operation 802. After that, the scheduler 506 transmits NC packets to be re-transmitted, to the receiver, via the selected path in operation 804. Therefore, when these processes are performed, the method can obtain an diversity gain according to the use of an MPTCP.

Figure 9:
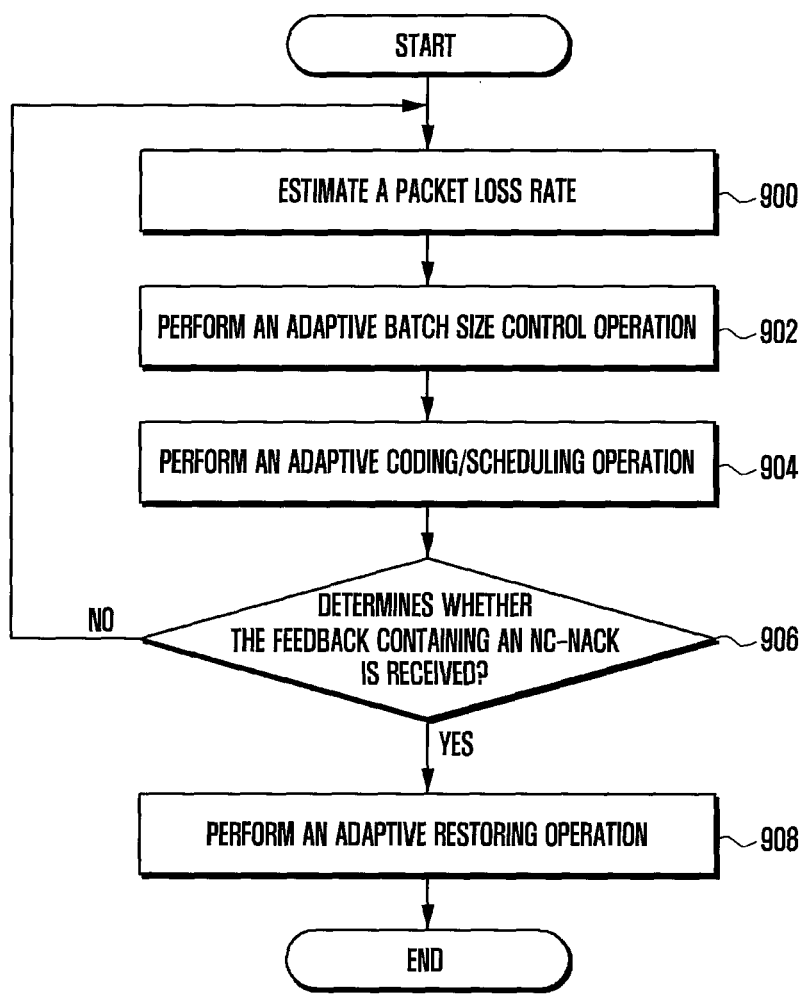
FIG. 9 is a flow diagram that describes a scheduling method of a transmitter according to an embodiment of the present disclosure.

Referring to FIG. 9, the method of performing the three operations described above is described. In the following description, for the sake of convenience, the ARLC-MPTCP control device 550 will be called a transmitter.

FIG. 9 is a flow diagram that describes a scheduling method of a transmitter according to an embodiment of the present disclosure.

Referring to FIG. 9, the transmitter estimates a packet loss rate for each of a number of paths in operation 900. The transmitter determines the batch size by performing the adaptive batch size control operation in operation 902. The transmitter performs an adaptive coding/scheduling operation based on the estimated packet loss rate and the batch size in operation 904. The transmitter determines whether it receives the feedback containing an NC-NACK from the receiver in operation 906.

When the transmitter does not receive the feedback containing an NC-NACK from the receiver in operation 906, it returns to operation 900. On the other hand, when the transmitter receives the feedback containing an NC-NACK from the receiver in operation 906, it performs an adaptive restoring operation for re-transmitting NC packets that the receiver has not received in operation 908.

In the following description, the receiver according to an embodiment of the present invention is explained referring to the accompanying drawings.

Figure 10:
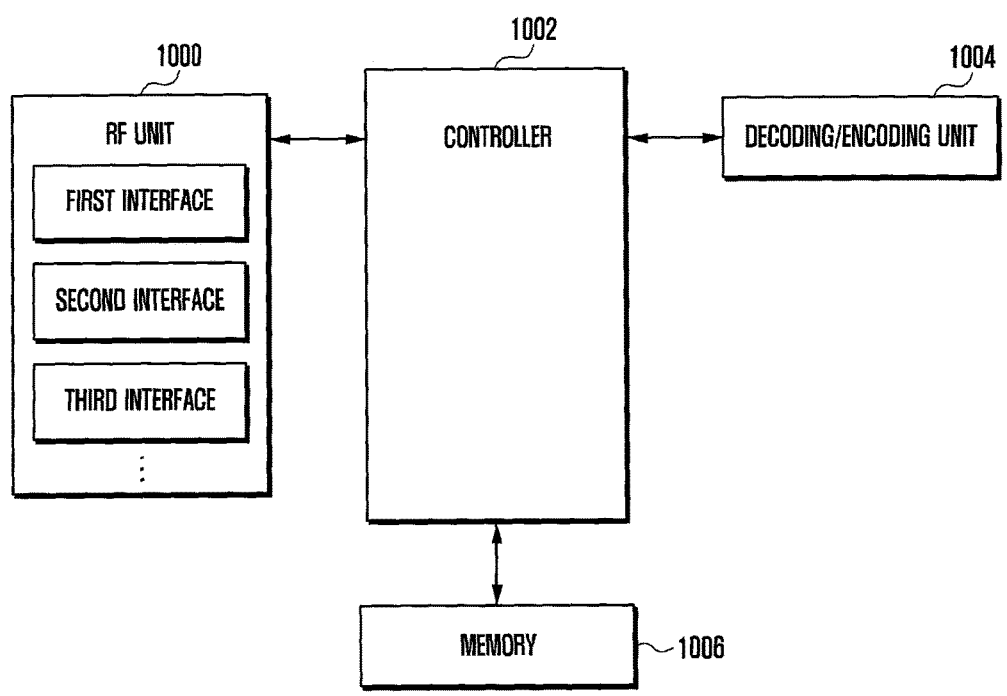
FIG. 10 is a block diagram of a receiver according to an embodiment of the present disclosure.

FIG. 10 is a block diagram of a receiver according to an embodiment of the present invention.

Referring to FIG. 10, the receiver includes a radio frequency (RF) unit 1000, a controller 1002, a decoding/encoding unit 1004 and a memory 1006.

The RF unit 1000 includes a number of wireless interfaces (first interface, second interface, third interface, etc.) for performing transmission/reception of NC packets based on various types of communication such as 3G, Wi-Fi, LTE, etc.

The controller 1002 controls the RF unit 1000, the decoding/encoding unit 1004 and the memory 1006 to perform operations of the receiver.

The decoding/encoding unit 1004 decodes the scheduling information, NC packets, etc., received from the transmitter or encodes a variety of information, such as feedback, etc., to be transmitted to the transmitter. The decoding/encoding unit 1004 may be implemented as a single physical component capable of both decoding and encoding operations. The decoding/encoding unit 1004 may also be implemented with a decoding unit and an encoding unit, physically separate from each other, performing a decoding operation and an encoding operation respectively.

The memory 1006 is capable of storing a variety of information created according to operations of the receiver, such as received feedback, feedback to be transmitted, etc. The memory 1006 may include a buffer for storing received NC packets.

In the following description, a method for the receiver configured as descried above to receive NC packets is explained referring to FIG. 11.

Figure 11:
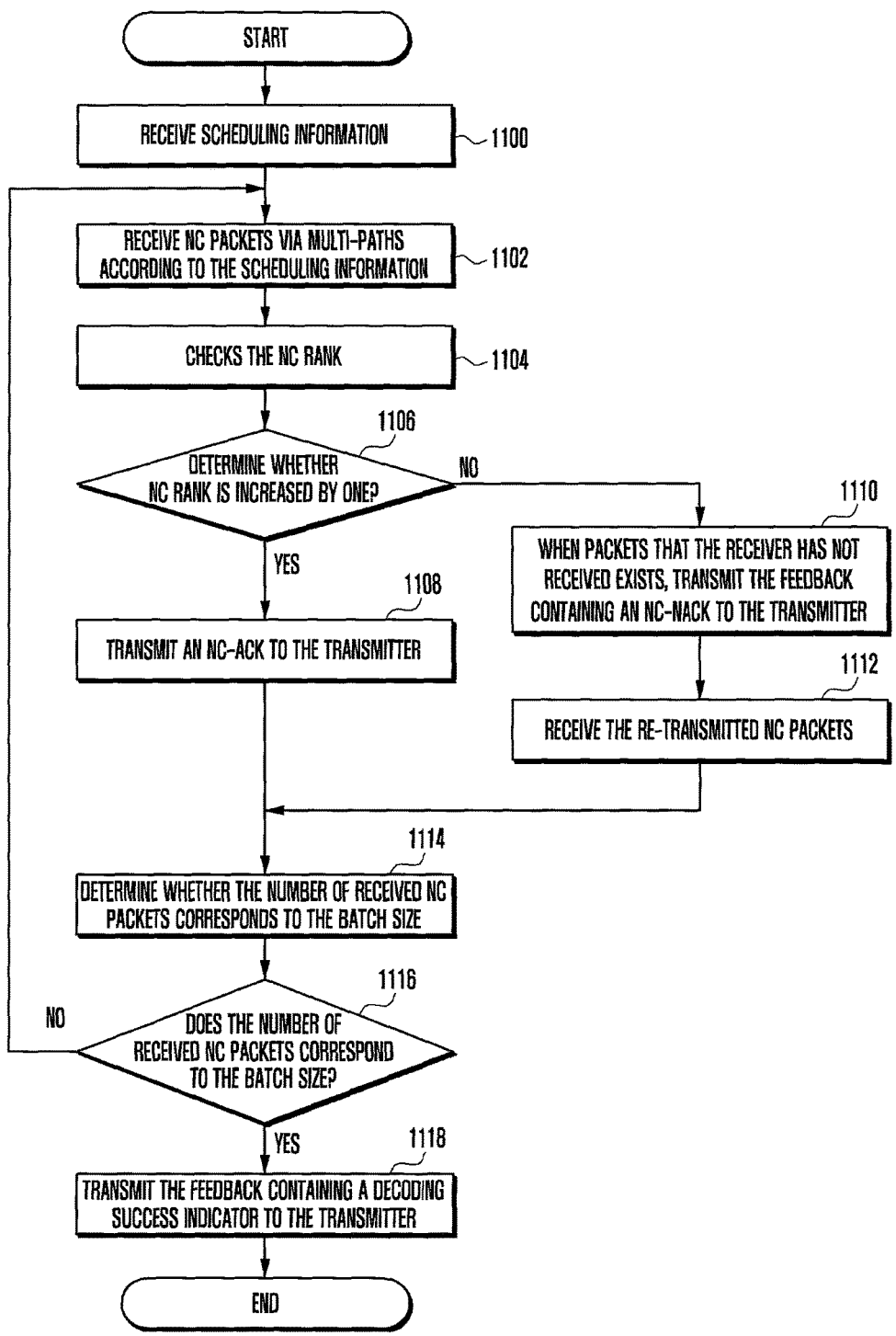
FIG. 11 is a flow diagram that describes a method for a receiver to receive NC packets according to an embodiment of the present disclosure.

FIG. 11 is a flow diagram that describes a method for a receiver to receive NC packets according to an embodiment of the present disclosure.

Referring to FIG. 11, the receiver receives scheduling information from a transmitter in operation 1100. The scheduling information may include information regarding the batch size and the redundancy data packet, etc. After that, the receiver receives NC packets from the transmitter via multi-paths according to the scheduling information in operation 1102.

The receiver checks the NC rank in 1104 and determines whether the NC rank is increased by one in operation 1106. When the receiver ascertains that the NC rank is increased by one in operation 1106, it transmits an NC-ACK to the transmitter in operation 1108. On the other hand, when the receiver ascertains that the NC rank is not increased by one in operation 1106, it continues receiving NC packets and transmits, when packets that it has not received exists based on the packet number, the feedback containing an NC-NACK to the transmitter in operation 1110. After that, the receiver receives the re-transmitted NC packets from the transmitter in operation 1112.

The receiver determines whether the number of received NC packets corresponds to the batch size in operation in operation 1114. When the receiver ascertains that the number of received NC packets does not correspond to the batch size in operation in operation 1116, it returns to operation 1102. On the other hand, when the receiver ascertains that the number of received NC packets corresponds to the batch size in operation in operation 1116, it transmits the feedback containing a decoding success indicator to the transmitter in operation 1118.

In the following description, a method of transmitting/receiving NC packets according to an embodiment of the present invention is explained referring to FIG. 12.

Figure 12:
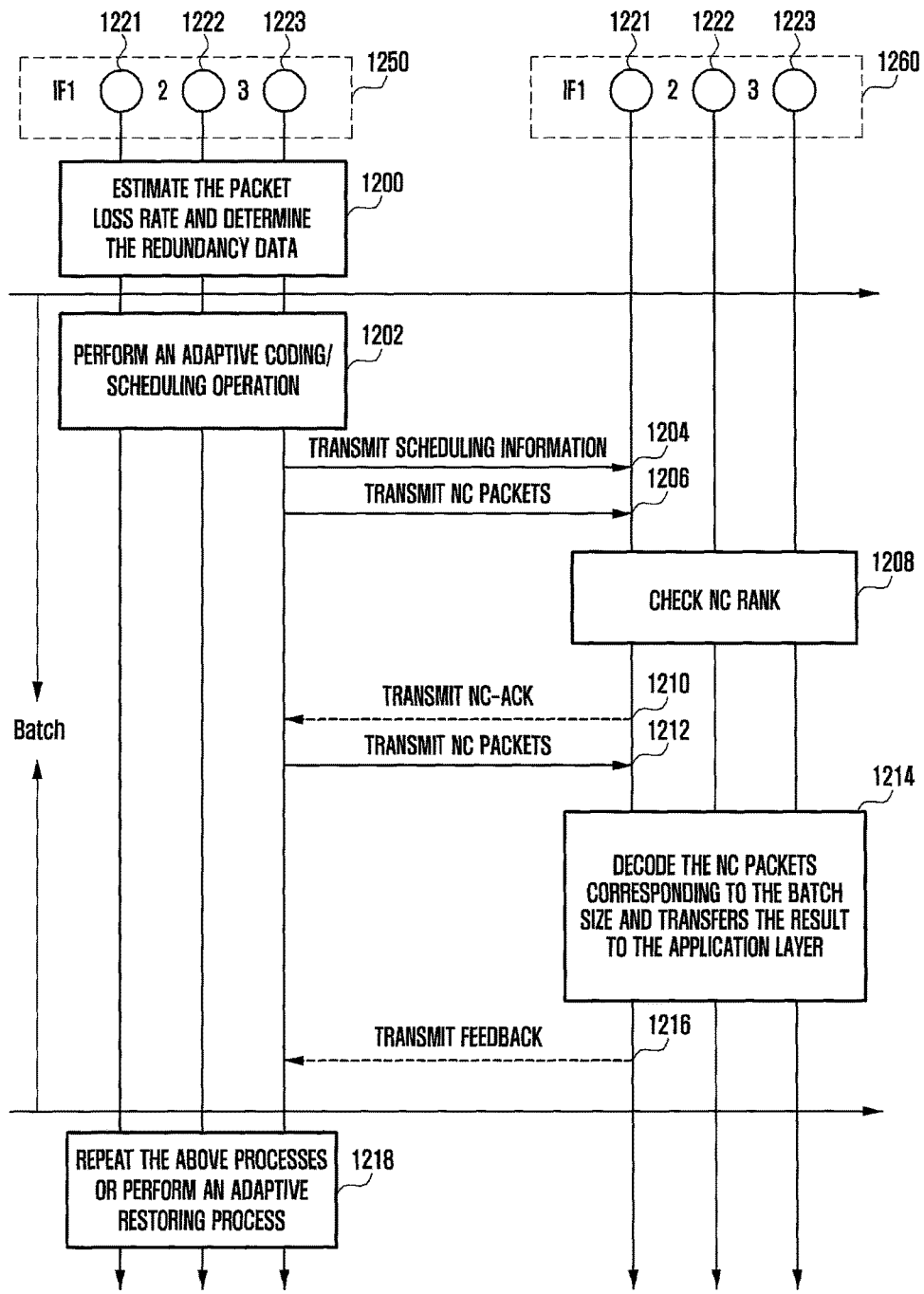
FIG. 12 is a signal flow diagram that describes a method of transmission/reception of NC packets according to an embodiment of the present disclosure.

FIG. 12 is a signal flow diagram that describes a method of transmission/reception of NC packets according to an embodiment of the present invention.

Referring to FIG. 12, the transmitter 1250 and the receiver 1260 communicate with each other via three paths, e.g., a first path 1221, a second path 1222 and a third path 1223.

The transmitter 1250 estimates the packet loss rate for the individual paths to determine the redundancy data in operation 1200. The transmitter 1250 determines a batch size through an adaptive batch size control operation and then performs an adaptive coding/scheduling operation to allocate NC packets to each of the three paths in operation 1202. After that, the transmitter 1250 transmits the scheduling information to the receiver 1260 in operation 1204.

The following table 3 is an example of the scheduling information.

TABLE 3

| Batch (block) # | Batch size | Packets sequence # of batch | Redundancy | Estimated RTT for each flow | Coding coefficients of all coded packets |
| --- | --- | --- | --- | --- | --- |

In table 3, "Batch (block) #" denotes the batch numbers; "Batch size" denotes a batch size; "Packet sequence # of batch" denotes the packet number in a corresponding batch; "Redundancy" denotes information regarding redundancy data; "Estimated RTT for each flow" denotes an estimated RTT for each path; and "Coding coefficients of all coded packets" denotes information regarding coding coefficients used when corresponding packets are encoded. When the scheduling information as described in table 3, including information regarding coding coefficients of all batches, has been transmitted, the coding coefficients do not need to be re-transmitted.

When the receiver 1260 receives the scheduling information as described above, it receives NC packets according to a corresponding batch size from the transmitter 1250 in operation 1206. The NC packets received from the transmitter 1250 are expressed as in the following table 4.

TABLE 4

| NC- indicator | Batch # | Coding coefficent | Data |
| --- | --- | --- | --- |

In table 4, "NC-indicator" denotes information indicating that a corresponding packet is an NC packet (e.g., it can be set to 0 or 1); "Batch #" denotes the batch number; "Coding coefficient" denotes information regarding a coding coefficient used when a corresponding packet is encoded; and "Data" denotes data.

The receiver 1260 checks an NC rank, and determines whether the NC rank increases by one in operation 1208. When the NC rank increases by one, the receiver 1260 transmits, to the transmitter 1250, an NC-ACK informing that corresponding NC packets have been received in operation 1210. The following table 5 is an example of the NC-ACK.

TABLE 5

| Rank of received codewords | Batch # |
| --- | --- |

In table 5, "Rank of received codewords" denotes rank information checked by the receiver 1260; and "Batch #" denotes the batch numbers.

After receiving the NC-ACK, the transmitter 1250 transmits the following NC packets to the receiver 1260 in operation 1212. The receiver 1260 determines whether NC packets corresponding to the buffer size are received. When the receiver 1260 ascertains that NC packets corresponding to the buffer size are received, it decodes the NC packets and transfers the decoded NC packets to the application layer in operation 1214. For example, when the receiver 1260 ascertains that the batch size is 20 and the checked NC rank is 20, it decodes 20 received NC packets and transfers the 20 decoded NC packets to the application layer, thereby preventing the reception buffer blocking.

On the other hand, when the receiver 1260 ascertains that the received NC packets do not correspond to the buffer size, it receives additional NC packets from the transmitter 1250. When the receiver 1260 has received and decoded NC packets corresponding to the batch size, it transmits, to the transmitter 1250, the feedback with information indicating that all the NC packets corresponding to a corresponding batch size have been successfully decoded in operation 1216. The feedback as described in table 1 may further contain the batch number, the rank information, the buffer status information, the RTT information, the packet loss rate, etc.

When the processes performed in a unit of batch are ended, the transmitter 1250 and the receiver 1260 repeat processes similar to the processes described above or an adaptive restoring operation in operation 1218. The adaptive restoring operation is performed for the following case: when the receiver 1260 detects NC packets that it has not received, it transmits feedback containing an NC-NACK to the transmitter 1250 so as to receive corresponding NC packets re-transmitted therefrom.

Figure 13:
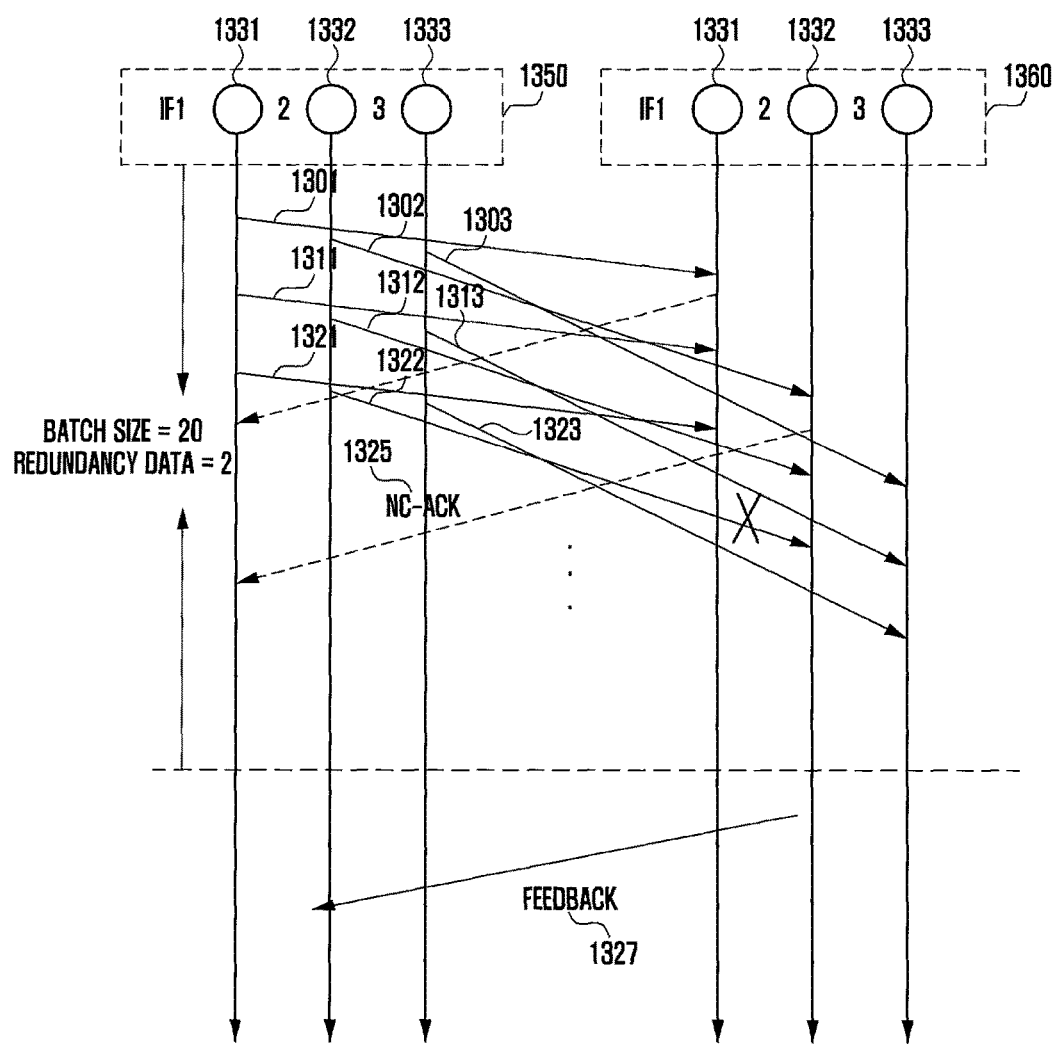
FIG. 13 is a detailed signal flow diagram that describes a method of transmission/reception of NC packets according to an embodiment of the present disclosure.

FIG. 13 is a detailed signal flow diagram that describes a method of transmission/reception of NC packets according to an embodiment of the present disclosure.

Referring to FIG. 13, the transmitter 1350 and the receiver 1360 communicate with each other via three paths, e.g., a first path 1321, a second path 1322 and a third path 1323. When the batch size is 20 and the redundancy rate is 10%, the number of data packets to be transmitted may be 20 and the number of redundancy data packets may be two. That is, the number of NC packets may be 22.

"a1" (reference number 1301), "a1+a2" (1311), and "a2" (1321) are sequentially transmitted from the transmitter 1350 to the receiver 1360 via the first path 1331. Although the receiver 1360 does not receive the "a1" (1301) due to the packet loss, it obtains both "a1" and "a2" and thus normally performs a decoding operation.

Similarly, "a5" (reference number 1303), "a6" (1313), and "a5+a6" (1323) are sequentially transmitted from the transmitter 1350 to the receiver 1360 via the third path 1333. Although the receiver 1360 does not receive the "a6" (1313) due to the packet loss, it obtains both "a5" and "a6" and thus normally performs a decoding operation.

That is, like a case where the receiver 1360 receives "a3" (1302), "a3+a4" (1312), and "a3" (1322) transmitted sequentially from the transmitter 1350 via the second path 1332, and decodes the packets, it can also normally perform decoding operations for the packets via the first path 1331 and the third path 1333.

When the receiver 1360 cannot perform the decoding operation with only the NC packets that it has received, it may receive NC packets that it has not through re-transmission, thereby successfully performing the decoding operation.

The receiver 1360 transmits, to the transmitter 1350, feedback 327 indicating that the decoding operation for corresponding NC packets has been successfully performed, so that the transmission/reception of NC packets corresponding to the next batch size can be performed therebetween.

As described above, the apparatus and method according to embodiments of the present invention may be variously utilized in a wireless network environment employing an MPTCP.

For example, the method and apparatus according to embodiments of the present invention may be used for communication between a terminal and a proxy server between the Internet and a base station (or an access point) (or between a terminal and the base station, an access point, etc.) via a number of paths. In this case, the proxy server allocates traffic to a path of a relatively low load, from among a number of paths, thereby reducing the congestion of resources.

In the environment described above, the method and apparatus can obtain a multi-path diversity gain through the transmission/reception of packets considering the packet loss rate and a delay time and also increase the utilization of resources and the throughput. In addition, the method and apparatus can rapidly switch a failed link to another link, thereby increasing the reliability and the stability of packet transmission/reception.

Figure 14:
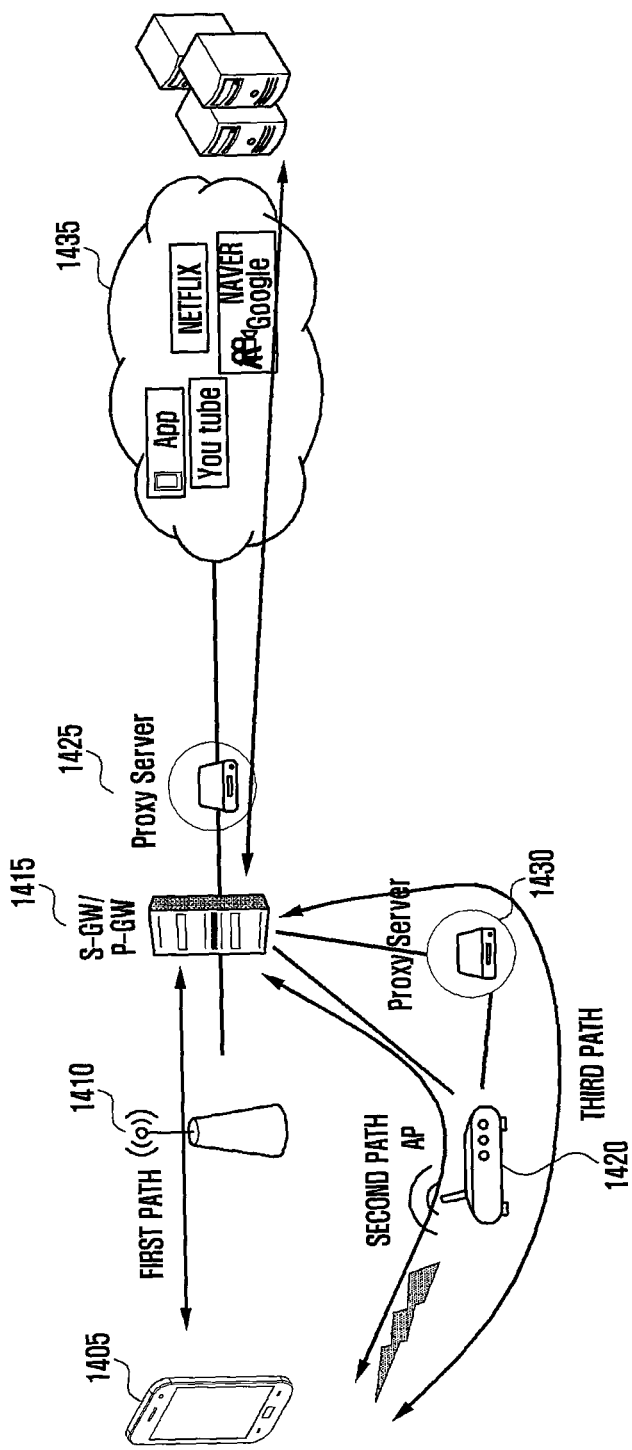
FIG. 14 is a diagram showing a configuration of a system configured to perform transmission/reception of data according to an embodiment of the present disclosure.

FIG. 14 is a diagram showing a configuration of a system configured to perform transmission/reception of data according to an embodiment of the present disclosure.

Referring to FIG. 14, the terminal 1405 is capable of connecting to the gateway 1415 via at least one of the base station 1410 and AP 1420. In the embodiment, the gateway 1415 includes one or more of the following: a Serving Gateway (S-GW) and a Packet Data Network (PDN) gateway (P-GW).

The base station 1410 and/or the AP 1420 are capable of adjusting a redundancy rate for data transmitted to the terminal 1405. In embodiments, the base station 1410 and/or the AP 1420 may adjust the redundancy rate based on a PLR of the terminal 1405. The base station 1410 and/or the AP 1420 may add/remove a redundancy rate to/from packets received from the proxy servers 1425 1430 and then transmit the packets to the terminal 1405.

The gateway 1415 is capable of connecting to a server 1435 in the Internet and transmitting data between the terminal 1405 and the server 1430 in the Internet. In the embodiment, the communication system is capable of including one or more Proxy Servers 1425 and 1430. According to embodiments, the proxy servers 1425 and 1430 may be collocated on the same node as the gateway 1415.

In the embodiment, the proxy servers 1425 and 1430 are capable of storing data received from the server 1435 in the Internet. The proxy servers 1425 and 1430 are also capable of encoding the received data with redundancy packets and storing the encoded result. In the embodiment, the proxy servers 1425 and 1430 are capable of receiving data requested by the terminal 1405 from the server 1435 in the Internet, encoding the received data in real time, and transmitting the encoded data to the terminal 1405. In the embodiment, the proxy servers 1425 and 1430 are capable of creating redundancy packets based on the feedback received from at least one of the following: a base station 1410, an AP 1420 and a terminal 1405. More specifically, the proxy servers 1425 and 1430 may adjust a redundancy rate based on the feedback. In an embodiment, when the base station 1410 or AP 1420 in the communication system increases in the encoding load, the proxy servers 1425 and 1430 may encode data received from the server 1435 in the Internet, so that redundancy packets can be created at a higher rate.

In the embodiment, the terminal 1405 may receive data via one or more of the first, second and third paths. The terminal 1405 may also transmit/receive data via the MPTCP as described in the previous embodiments.

Figure 15:
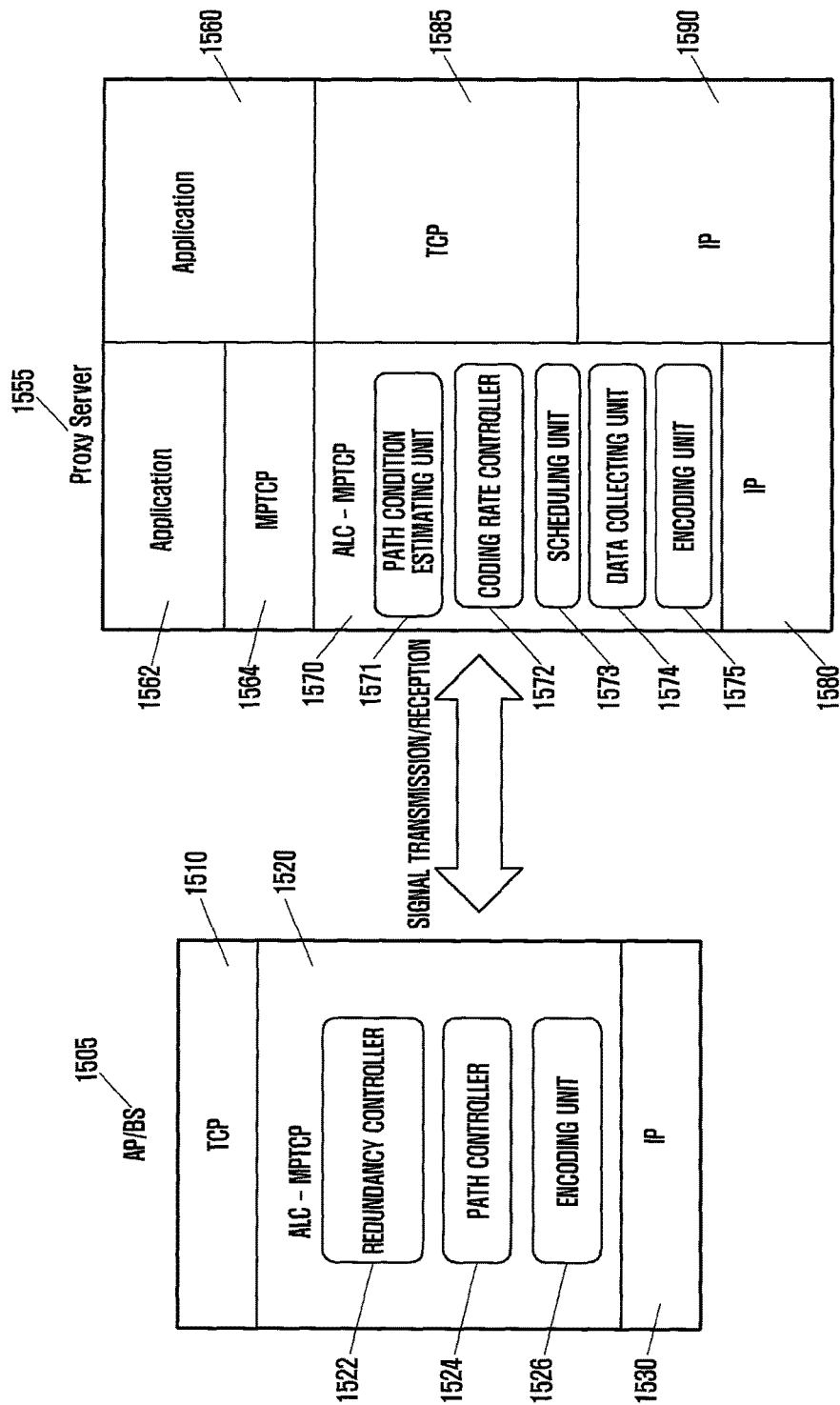
FIG. 15 is a diagram showing a configuration of an AP/BS and a proxy server according to an embodiment of the present disclosure.

FIG. 15 is a diagram showing a configuration of an AP/BS and a proxy server according to an embodiment of the present disclosure.

Referring to FIG. 15, the Access Point or Base Station (AP/BS) 1505 is capable of including a TCP layer 1510, an ALC-MPTCP layer 1520 and an IP layer 1530.

In the embodiment, the ALC-MPTCP layer 1520 is capable of including one or more of the following: a redundancy controller 1522, a path controller 1524 and an encoding unit 1526.

In the embodiment, the redundancy controller 1522 may determine a redundancy rate to be added to or removed from the data received from the proxy server 1555. When the PLR of the terminal that will receive the data is greater than the redundancy value of the received data, the redundancy controller 1522 may determine a redundancy vale to be added. On the other hand, when the PLR of the terminal is less than the redundancy value of the received data, the redundancy controller 1522 may determine a redundancy vale to be removed.

The path controller 1524 is capable of determining a path for performing an MPTCP. This may correspond to the operation of the embodiment described above.

The encoding unit 1526 is capable of encoding data to be transmitted according to the redundancy rate determined by the redundancy controller 1522.

The AP/BS 1505 may further include a transceiver capable of transmitting/receiving data to/from other networks.

Referring to FIG. 15, the proxy server 1555 is capable of including one or more of the following: an application layer 1560, a TCP layer 1585 and an IP layer 1590.

The application layer 1560 is capable of including another application layer 1562 and an MPTCP layer 1564.

In the embodiment, the ALC-MPTCP layer 1570 may be located in one or more of the following: the TCP layer 1585 and the IP layer 1590. The ACL-MPTCP layer 1570 is capable of including one or more of the following: a path condition estimating unit 1571, a coding rate controller 1572, a scheduling unit 1573, a data collecting unit 1574 and an encoding unit 1575.

The path condition estimating unit 1571 is capable of estimating a path condition to perform an MPTCP.

The coding rate controller 1572 is capable of determining a coding rate including a redundancy rate, based on one or more of the information items received from the terminal and the AP/BS. For example, when the PLRs of terminals are generally increased, the coding rate controller 1572 may determine the redundancy rate to a higher value.

The scheduling unit 1573 is capable of scheduling for transmission/reception of data.

The data collecting unit 1574 is capable of collecting data from one or more of the following: the terminal and the AP/BS. The coding rate controller 1572 is capable of determining a coding rate based on the collected data.

The encoding unit 1575 is capable of encoding data at the coding rate determined by the coding rate controller 1572. In the embodiment, the encoding unit 1575 may encode data to be transmitted to the AP/BS 1505, thereby having the determined redundancy value.

Figure 16:
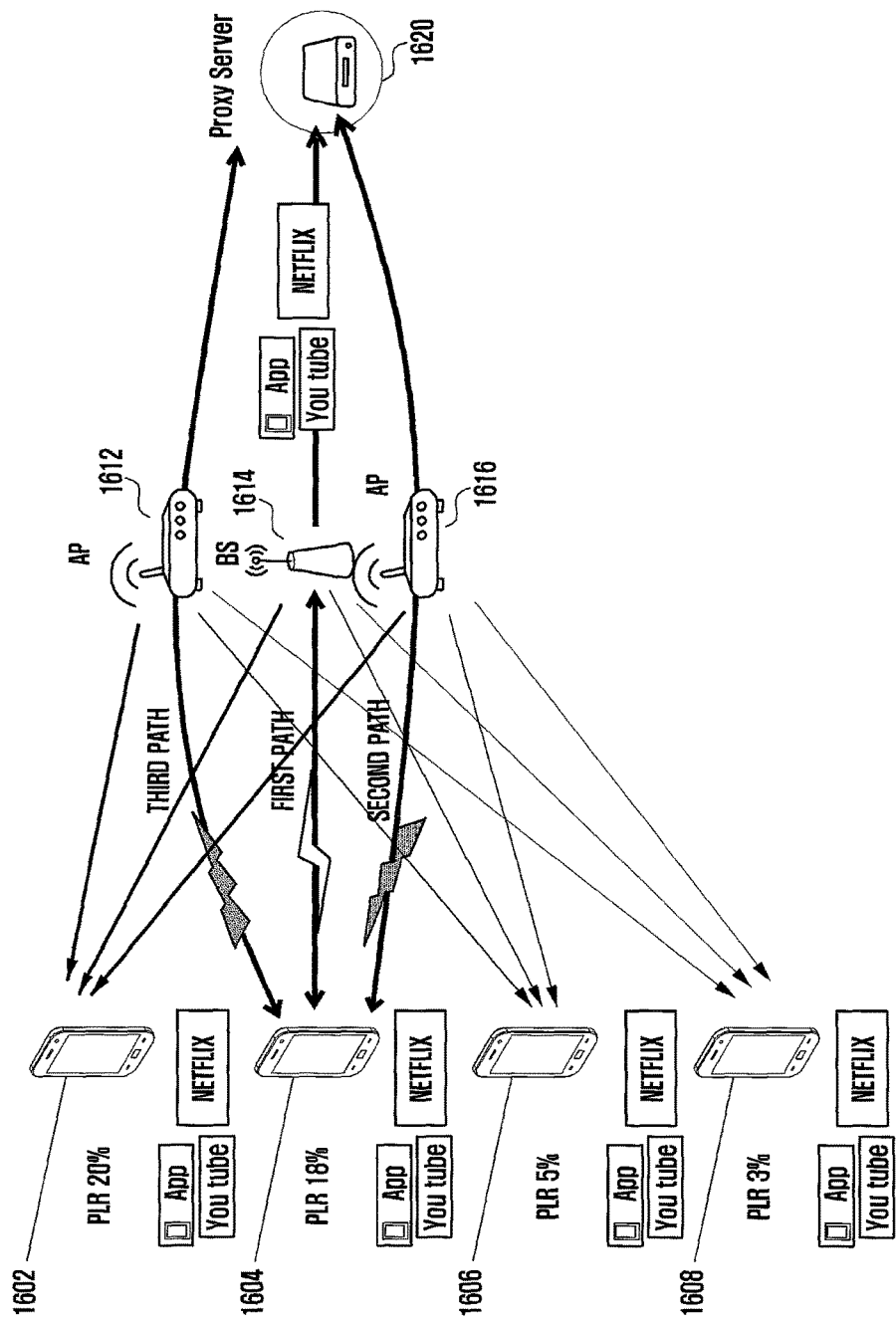
FIG. 16 is a diagram that describes the transmission/reception of data between a terminal and a communication system according to an embodiment of the present disclosure.

FIG. 16 is a diagram that describes the transmission/reception of data between a terminal and a communication system according to an embodiment of the present disclosure.

Referring to FIG. 16, the terminals 1602, 1604, 1606, and 1608 are capable of transmitting/receiving data to/from a proxy server 1620 via at least one of the APs and BS 1612, 1616, and 1614. The terminals 1602, 1604, 1606, and 1608 may have different Packet Loss Rates (PLRs). In the embodiment, the individual terminals 1602, 1604, 1606, and 1608 may request the same data or different data from the proxy server 1620. The individual terminals 1602, 1604, 1606, and 1608 may request data transmission from the proxy server 1620 via at least one of the first, second and third paths.

The proxy server 1620 receives data requested by the individual terminals 1602, 1604, 1606, and 1608 from designated servers in the Internet, encodes the received data, and transmits the encoded data to the terminals 1602, 1604, 1606, and 1608.

At least one of the following: the APs and BS 1612, 1616 and 1614 is capable of transmitting the data received from the proxy server 1620 to the terminals 1602, 1604, 1606, and 1608. In the embodiment, at least one of the following: the APs and BS 1612, 1616 and 1614 may: perform an encoding operation to obtain an additional redundancy or to reduce a redundancy, based on the PLRs of the terminals 1602, 1604, 1606, and 1608 and the redundancy value of data received from the proxy server 1620; and transmit the encoded result to the individual terminals 1602, 1604, 1606, and 1608.

The terminals 1602, 1604, 1606, and 1608 are capable of decoding the received data to restore the data.

In the embodiment, the proxy server 1620 is capable of receiving the feedback from at least one of the following: the terminals 1602, 1604, 1606, and 1608, APs and BS 1612, 1616 and 1614. An example of the feedback is described in the following table 6.

TABLE 6

| Expected Encoding Delay Given Redundancy | UE Required Redundancy | Available Bandwidth btw BS/AP - Server | Measured Packet Arrival at BS/AP | Congestion Info - path control |
|---|---|---|---|---|

Expected Encoding Delay Given Redundancy: It contains information related to a time required for encoding in the BS/AP when the proxy server 1620 transmits data to the BS/AP with a given redundancy. It may vary according to the computing capability of the BS/AP in proportion to the computational complexity.

UE Required Redundancy: It is a redundancy value required by the terminal. It may be determined according to the PLR of the terminal.

Available Bandwidth btw BS/AP-Server: It may include bandwidth information between the proxy server 1620 and the BS/AP. The proxy server 1620 may determine a redundancy rate based on the bandwidth information.

Measured Packet Arrival at BS/AP: It may include the channel information between the terminal and the AP/BS. The channel information may include at least one of the following: a time required for transmission and a transmissible amount. The AP/BS may determine the final redundancy rate of data to be transmitted to the terminal based on the channel information.

Congestion Info-path control: it may include information regarding the congestion of the path from the proxy server 1620 to the terminal. It may be used to adjust schedules of data to be transmitted via a number of paths.

Figure 17:
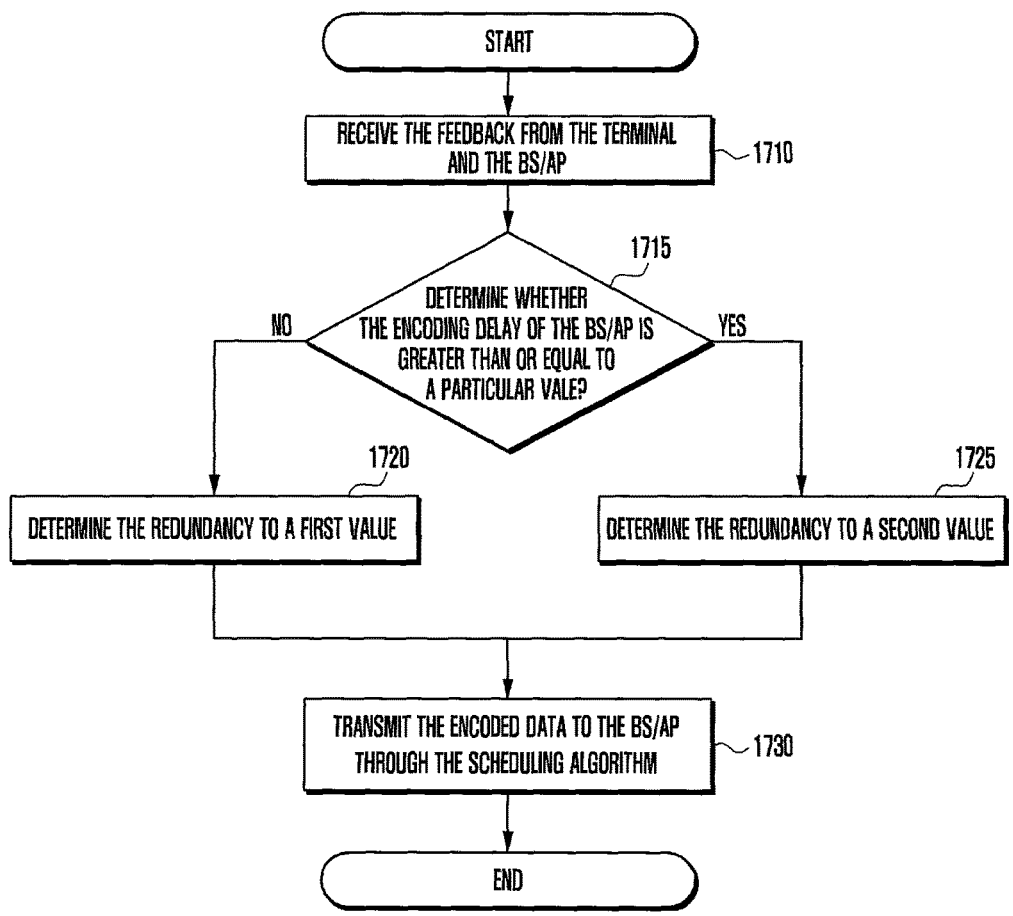
FIG. 17 is a flow diagram that describes operations of a proxy server according to an embodiment of the present disclosure.

FIG. 17 is a flow diagram that describes operations of a proxy server according to an embodiment of the present disclosure.

Referring to FIG. 17, the proxy server may receive the feedback from at least one of the terminal and the BS/AP in operation 1710. The feedback may include one or more of the items of information described in table 6. In the embodiment, the BS/AP may include one or more of the BS and the APs that transmit data to the terminal.

The proxy server determines whether the encoding delay of the BS/AP is greater than or equal to a particular vale in operation 1715. The particular value may be determined by the user settings or according to the performance of the BS/AP. The particular value may also be determined based on the traffic condition. The case that the encoding delay of the BS/AP is greater than or equal to a particular vale may include a situation where the BS/AP additionally performs an encoding operation according to the PLR of the terminal and thus the delay is increased. When the delay is increased, this causes the quality of data transmitted to the terminal to be deteriorated.

When the encoding delay of the BS/AP is greater than or equal to a particular vale in operation 1715, the proxy server may determine the redundancy to a second value in operation 1725. The second value may be determined, considering the bandwidth between the BS/AP and the proxy server. In another embodiment, the second value may include a redundancy value to utilize all the bandwidths used for transmission between the BS/AP and the proxy server.

When the encoding delay of the BS/AP is less than a particular vale in operation 1715, the proxy server may set the redundancy to a first value in operation 1720. In the embodiment, the first value may include one or more of the following: a PLR of the terminal, a bandwidth between the BS/AP and the proxy server, and a terminal request redundancy.

The proxy server encodes data with the determined redundancy value and transmits the encoded data to the BS/AP through a scheduling algorithm in operation 1730.

As described above, as the proxy server pre-encodes data to be transmitted according to an encoding delay of the BS/AP and then transmits the encoded data, the BS/AP may reduce the overhead when encoding data to be transmitted to the terminal. The operations of the proxy server may also function to transmit broadcast data.

Figure 18:
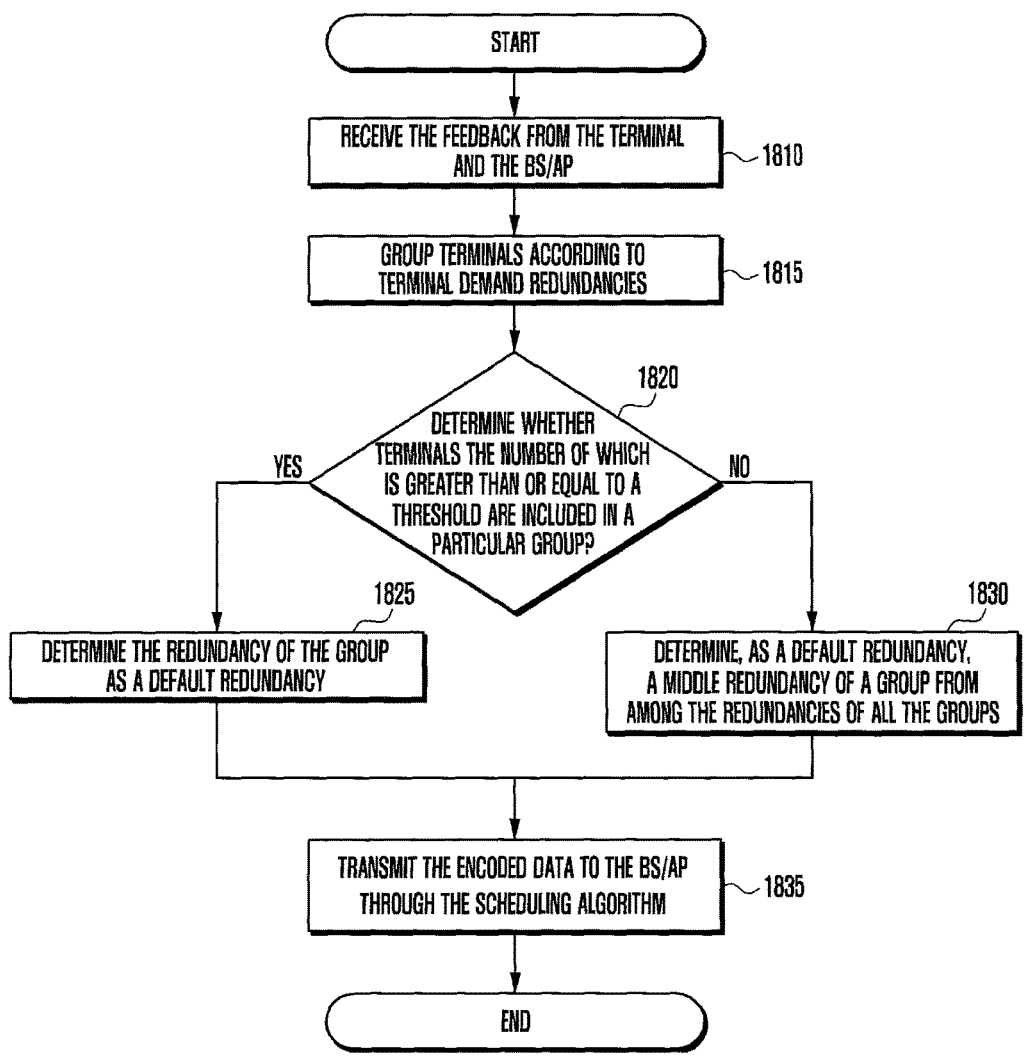
FIG. 18 is a flow diagram that describes operations of a proxy server according to another embodiment of the present disclosure.

FIG. 18 is a flow diagram that describes operations of a proxy server according to another embodiment of the present disclosure.

Referring to FIG. 18, the proxy server may receive the feedback from at least one of the terminal and the BS/AP in operation 1810. The feedback may include one or more of the items of information described in table 6. In the embodiment, the BS/AP may include one or more of the BS and the APs that transmit data to the terminal.

In operation 1815, the proxy server may group terminals according to terminal demand redundancies, based on information received in operation 1810. In the embodiment, the standard for grouping terminals may be determined by the operator settings. More specifically, the terminals located in a specific region may be grouped into the same group, based on a PLR of terminal or a redundancy value requested by a terminal. For example, for the terminals shown in FIG. 16, the terminal 1602 of which PLR is 20% and the terminal

1604 of which PLR is 18% may be grouped and the terminal 1606 of which PLR is 5% and the terminal 1608 of which PLR is 3% may be grouped, respectively.

In operation 1820, the proxy server may determine whether terminals the number of which is greater than or equal to a threshold are included in a particular group, based on the grouping result of operation 1815. The threshold may be determined by the operator settings. More specifically, the threshold may be 50% of the overall terminal. In another embodiment, when terminals greater than or equal to 150% of those in another group are included in a particular group, it may be determined that the group is greater than the threshold.

When terminals the number of which is greater than or equal to a threshold are included in a particular group in operation 1820, the proxy server may determine the redundancy of the group as a default redundancy in operation 1825. A redundancy of a group may be: a grouping interval for the group, the maximum redundancy included in the group, the minimum redundancy included in the group, or an average of redundancies requested by terminals included in the group. The redundancy value may be determined based on the feedback received in operation 1810.

On the other hand, when terminals the number of which is greater than or equal to a threshold are not included in a particular group in operation 1820, the proxy server may determine, as a default redundancy, a middle redundancy of a group from among the redundancies of all the groups in operation 1830. In an embodiment, when a first group has an additionally requested redundancy which is greater than or equal to 5% and less than 7%; a second group has an additionally requested redundancy which is greater than or equal to 7% and less than 9%; a third group has an additionally requested redundancy which is greater than or equal to 9% and less than 11%; and the number of terminals included in each of the three groups is less than a threshold, the proxy server may determine the redundancy of the second group as a default redundancy. The redundancy of the second group may be: a grouping interval for the group, the maximum redundancy included in the group, the minimum redundancy included in the group, or an average of redundancies requested by terminals included in the group. The redundancy value may be determined based on the feedback received in operation 1810.

After setting the redundancy, the proxy server may transmit the encoded data to the BS/AP through the scheduling algorithm in operation 1835.

Figure 19:
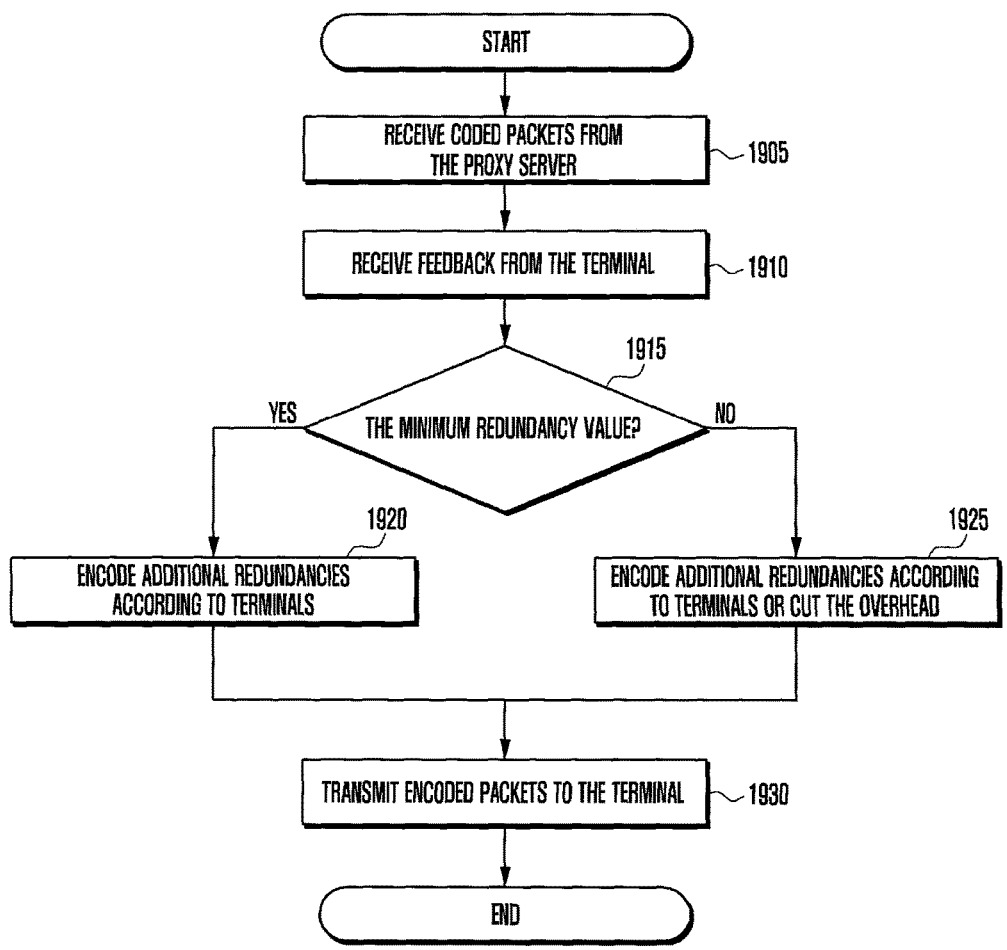
FIG. 19 is a flow diagram that describes operations of an AP/BS according to another embodiment of the present disclosure.

FIG. 19 is a flow diagram that describes operations of an AP/BS according to another embodiment of the present disclosure.

Referring to FIG. 19, the AP/BS is capable of receiving coded packets from the proxy server in operation 1905. In the embodiment, the proxy server may perform an encoding process to add a redundancy to data to be transmitted to the AP/BS. The redundancy value may be determined by the embodiments of the present disclosure. More specifically, the redundancy value may be determined through the embodiments referring to FIGS. 17 and 18. The AP/BS receives the encoded packets and detects the encoded redundancy value.

The AP/BS may receive feedback from the terminal in operation 1910. The feedback may include one or more of the following: information regarding a channel status between the terminal and the AP/BS, a PLR of the terminal, and a redundancy value requested by the terminal. In the embodiment, the feedback may further include information indicating conditions as to whether packets transmitted from the AP/BS have been successfully received and whether the decoding process has been successfully performed.

The AP/BS may determine whether the redundancy value of the packets received in operation 1905 is the minimum redundancy value in operation 1915. The minimum redundancy value may include a value without redundancy or the minimum redundancy value set to the proxy server.

When the packets received in operation 1905 has the minimum redundancy value in operation 1915, the AP/BS determines a redundancy value to be additionally assigned according to terminals, based on the information received in operation 1910, and encodes packets in operation 1920. In an embodiment, when the minimum redundancy value is 5% and the redundancy value requested by the terminal is 10%, the AP/BS may re-encode data received to satisfy the additional redundancy of 5%.

When the packets received in operation 1905 does not have the minimum redundancy value in operation 1915, the AP/BS encodes additional redundancies according to terminals, based on the values received in operation 1910, or cuts the overhead to reduce the extra redundancy value in operation 1925. More specifically, when the redundancy of packets received from the server is 10% and the redundancy requested by the terminal is 7%, the AP/BS may perform an encoding process to reduce the redundancy overhead of 3%. The overhead cutting operation prevents the bandwidth between the terminal and the AP/BS from being wasted.

The AP/BS may transmit the encoded packets to the terminal in operation 1930.

Figure 20:
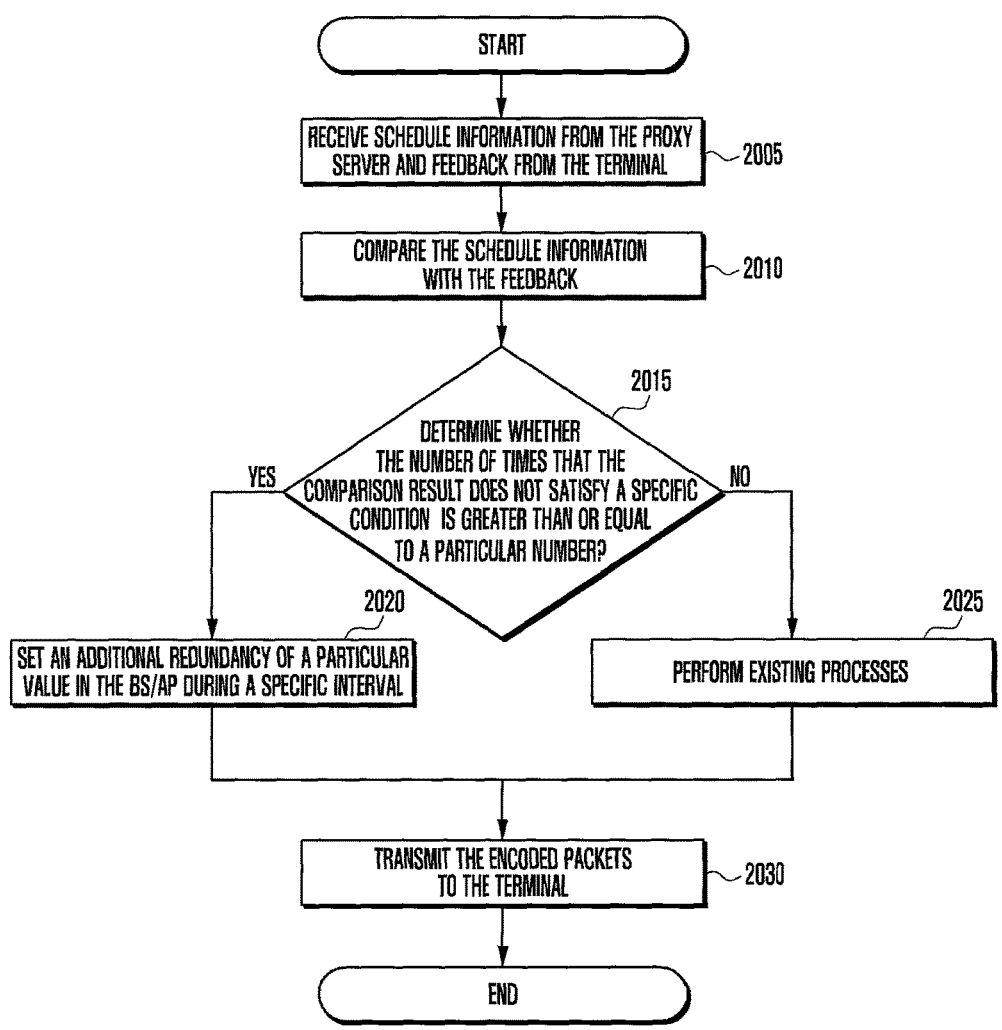
FIG. 20 is a flow diagram that describes operations of an AP/BS according to another embodiment of the present disclosure.

FIG. 20 is a flow diagram that describes operations of an AP/BS according to another embodiment of the present disclosure.

Referring to FIG. 20, the AP/BS is capable of receiving encoded packets from the proxy server in operation 2005. In the embodiment, the proxy server may perform an encoding process to add a redundancy to data to be transmitted to the AP/BS. The redundancy value may be determined by the embodiments of the present disclosure. More specifically, the redundancy value may be determined through the embodiments referring to FIGS. 17 and 18. The AP/BS receives the encoded packets and detects the encoded redundancy value. The AP/BS may receive feedback from the terminal in operation 2005. The feedback may include one or more of the following: information regarding a channel status between the terminal and the AP/BS, a PLR of the terminal, and a redundancy value requested by the terminal. In the embodiment, the feedback may further include information indicating conditions as to whether packets transmitted from the AP/BS have been successfully received and whether the decoding process has been successfully performed.

The AP/BS may compare the redundancy value requested by the terminal with the redundancy value of the packets received from the proxy server in operation 2010. In the embodiment, the redundancy value requested by the terminal may be compared with an average of values obtained by comparing the redundancy values, requested by the entire terminal transmitting/receiving data to/from the AP/BS, with the redundancy value assigned by the proxy server. The redundancy value requested by a selected terminal may be compared with the redundancy value assigned by the proxy server.

The AP/BS may determine whether the number of times that the comparison result does not satisfy a specific condition is greater than or equal to a particular number in operation 2015. The specific condition may be expressed by the following equation.

$$\left|\frac{UE\_redundancy}{Server\_redundancy} - 1\right| < p.$$

UE_redundancy: a redundancy value requested by a terminal.

Server_redundancy: a redundancy value of data assigned by a server.

P: It may be determined by the settings and has a value from 0 to 1. For example, P may be 0.3.

When the condition is satisfied, this means that the difference between the redundancy value requested by the terminal and the redundancy value assigned by the server is less than a particular ratio. In this case, the AP/BS may additionally perform an encoding process to satisfy the redundancy requested by the terminal. However, when the difference between the redundancy value requested by the terminal and the redundancy value assigned by the server is greater than or equal to a particular ratio, the AP/BS ascertains that the terminals in the service area are generally deteriorated and proceeds with operation 2020.

In the embodiment, the particular number of times may be an integer between 2 and 10.

In the embodiment, when the number of times that the comparison result does not satisfy a specific condition is less than a particular number in operation 2015, the AP/BS may unconditionally secure an additional redundancy of a specific value in the data transmitted from the BS in operation 2020. The redundancy of a specific value may have a value from 1 to 100%. Particularly, the redundancy of a specific value may include 20%.

When the condition is satisfied, the AP/BS may perform existing processes in operation 2025. The existing processes correspond to operations 1915 to 1925 in FIG. 19.

The AP/BS may transmit the encoded packets to the terminal in operation 2030.

Figure 21:
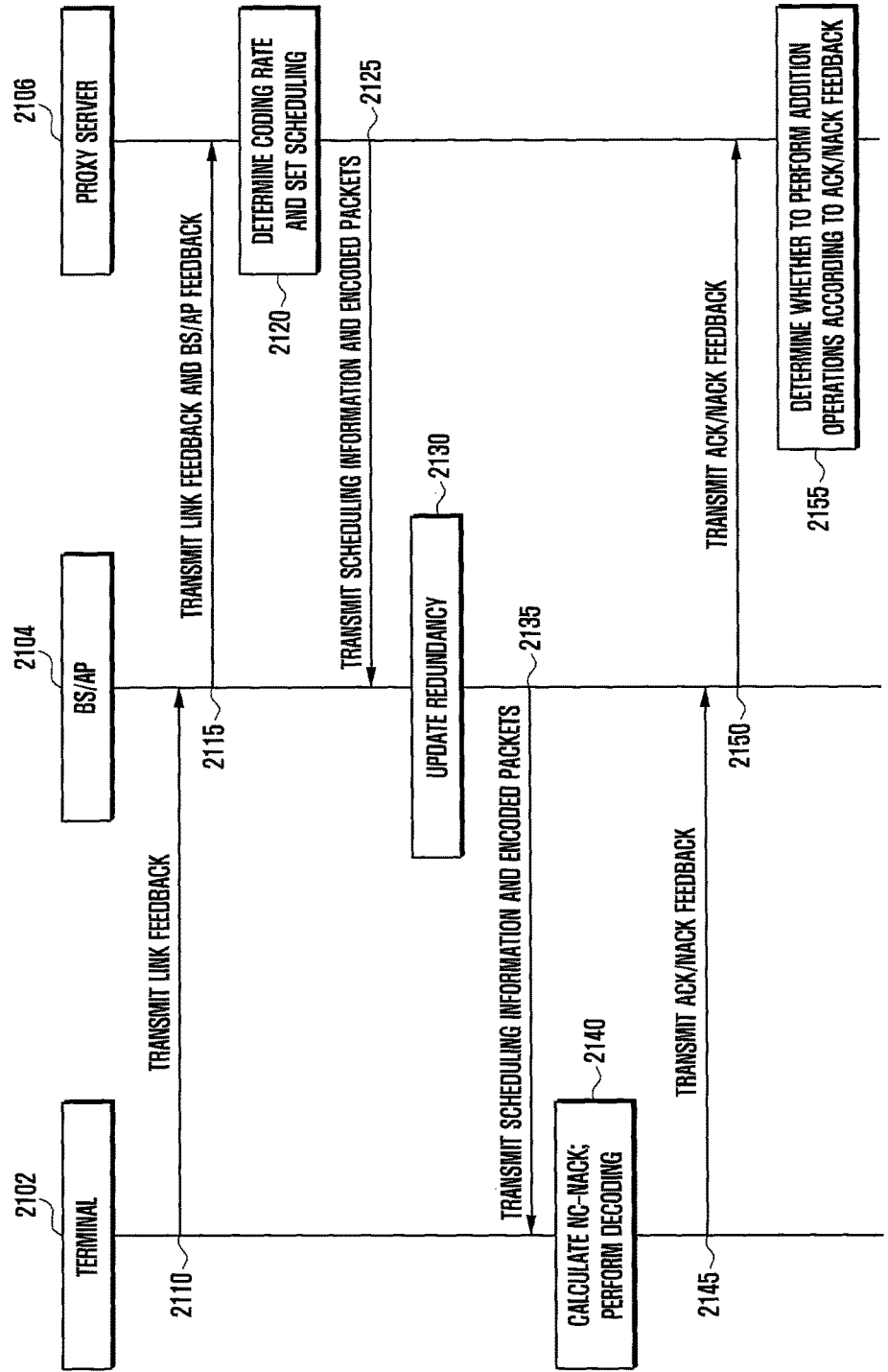
FIG. 21 is a flow diagram that describes a method of transmission/reception of signals in a communication system according to another embodiment of the present disclosure.

FIG. 21 is a flow diagram that describes a method of transmission/reception of signals in a communication system according to another embodiment of the present disclosure.

Referring to FIG. 21, transmission/reception of data is performed between the terminal 2102, the AP/BS 2104 and the proxy server 2106. In the embodiment, the AP/BS 2104 may also be called a base station.

In operation 2110, the terminal 2102 is capable of transmitting link feedback to the base station 2104. The link feedback may include one or more of the following: channel information between the terminal 2102 and the base station 2104, a redundancy rate requested by the terminal 2102, and a condition as to whether the terminal 2102 has successfully received data.

In operation 2115, the base station 2104 is capable of transmitting the APBS feedback and the information received in operation 2110 to the proxy server 2106. The AP/BS feedback may include one or more of the following: Expected Encoding Delay Given Redundancy, Available Bandwidth btw BS/AP, Measured Packet Arrival at BS/AP and Congestion Info-path control.

In operation 2120, the proxy server 2106 may determine the coding rate of data to be transmitted, based on the information received in operation 2115, and also set the scheduling.

In operation 2125, the proxy server 2106 may transmit packets to the base station 2104, based on the information determined and set in operation 2120.

In operation 2130, the base station 2104 may update the redundancy, based on the redundancy rate requested by the terminal 2102 and the redundancy value of packets received in the operation 2125. In the embodiment, operation 2130 may execute a process corresponding to one of the operations shown in FIGS. 19 and 20.

In operation 2135, the base station 2104 may transmit, to the terminal 2102, a packet of which the redundancy is updated in the operation 2130.

In operation 2140, the terminal 2102 is capable of decoding the received packet and calculating the NC-NACK.

In operation 2145, the terminal 2102 is capable of transmitting a condition as to whether the packet decoding is successful to the base station 2104.

In operation 2150, the base station 2104 is capable of transmitting, to the proxy server 2106, the received information indicating the condition as to whether the packet decoding is successful.

In operation 2155, the proxy server 2106 may determine whether it performs an additional operation, based on the condition as to whether the packet decoding is successful. In an embodiment, when the failure of reception is frequent, the proxy server 2106 may perform operations to increase an encoding redundancy rate.

The embodiments of the present invention described in the description and drawings, using particular terms, are merely provided to assist in a comprehensive understanding of the invention and are not suggestive of limitation. Although embodiments of the invention have been described in detail above, it should be understood that many variations and modifications of the basic inventive concept herein described, which may be apparent to those skilled in the art, will still fall within the spirit and scope of the embodiments of the invention as defined in the appended claims.

The invention claimed is:

1. A method of transmitting or receiving packets in a proxy server of a wireless communication system comprising:

receiving, from a data server, a packet corresponding to a data request;

receiving, from a network entity, feedback information for a transmission status including feedback of terminals related to the network entity, the network entity including a base station or an access point (AP);

grouping, by the proxy server, the terminals according to a redundancy rate of the terminals based on the feedback information;

determining, by the proxy server, a redundancy rate for encoding the received packet based on a redundancy rate of each group;

encoding, by the proxy server, the received packet based on the determined redundancy rate; and transmitting, to the network entity, the encoded packet.

2. The method of claim 1, wherein:

receiving the feedback information comprises receiving information for an encoding delay of the network entity; and determining the redundancy rate comprises determining the redundancy rate based on the encoding delay.

3. The method of claim 2, wherein:

receiving the feedback information comprises receiving information regarding a bandwidth between the network entity and the proxy server; and determining the redundancy rate comprises determining the redundancy rate based on the bandwidth if the encoding delay is greater than or equal to a preset value.

4. The method of claim 1, further comprising:
receiving, from the terminals, a terminal request redundancy; and
classifying the terminals into two or more groups, based on the terminal request redundancy,
wherein determining the redundancy rate comprises based on information regarding the classified groups.

5. The method of claim 4, wherein determining the redundancy rate comprises:
if terminals greater than or equal to a particular ratio, from among the terminals transmitting or receiving the packets to or from the proxy server, belong to one group, determining redundancy rates based on a redundancy requested by a terminal of a corresponding group.

6. The method of claim 1, wherein determining the redundancy rate based on the feedback information comprises determining a redundancy value to be removed.

7. A method of transmitting or receiving packets in a network entity including a base station or an access point in a wireless communication system comprising:
receiving, from a server, a packet for a group of terminals encoded based on a first redundancy rate for the group, the first redundancy rate for the group being determined based on a redundancy rate of the group;
receiving channel status information from a terminal;
encoding the received packet based on a second redundancy rate that is determined based on the channel status information and the first redundancy rate; and
transmitting the packet, encoded based on the second redundancy rate, to the terminal,
wherein the group of terminals is grouped according to a redundancy rate of the terminals based on feedback information acquired from the terminals.

8. The method of claim 7, wherein encoding the received packet comprises:
comparing the first redundancy rate with a redundancy rate requested by the terminal, determined based on the channel status information; and
determining the second redundancy rate based on the comparison.

9. The method of claim 7, wherein encoding the received packet comprises:
comparing the first redundancy rate with a redundancy rate requested by the terminal, determined based on the channel status information; and
when the first redundancy rate is less than the redundancy rate requested by the terminal by less than or equal to a particular value, determining that the second redundancy rate is greater than the first redundancy rate by greater than a preset value.

10. A method of transmitting or receiving packets in a terminal of a wireless communication system comprising:
transmitting channel status information to a network entity, the network entity including an access point (AP) or a base station; and
receiving a packet encoded by the AP or the base station, from the AP or the base station,
wherein the received packet is encoded in such a way that:
a server encodes the packet for a group of terminals based on a first redundancy rate for the group and transmits the encoded packet to the network entity, the network entity encodes the encoded packet on a second redundancy rate that is determined based on the channel status information and the first redundancy rate, the first redundancy rate being determined based on a redundancy rate of the group,
wherein the group of terminals is grouped according to a redundancy rate of the terminals based on feedback information acquired from the terminals.

11. The method of claim 10, wherein the second redundancy rate is determined based on a result of comparing the first redundancy rate with a redundancy rate requested by the terminal, determined based on the channel status information.

12. The method of claim 10, wherein the second redundancy rate is determined by: comparing the first redundancy rate with a redundancy rate requested by the terminal, determined based on the channel status information; and
when the first redundancy rate is less than the redundancy rate requested by the terminal by less than or equal to a particular value, determining that the second redundancy rate is greater than the first redundancy rate by greater than a preset value.

13. The method of claim 10, wherein the first redundancy rate is determined based on encoding load of the AP.

14. A proxy server for transmitting or receiving packets in a wireless communication system comprising:
a transceiver for transmitting or receiving at least one signal; and
a controller coupled with the transceiver and configured to:
receive, from a data server, a packet corresponding to a data request,
receive, from a network entity, feedback information for a transmission status including feedback of terminals related to the network entity, the network entity including a base station or an AP,
group terminals according to a redundancy rate of the terminals based on the feedback information,
determine a redundancy rate for encoding the received packet based on a redundancy rate of each group,
encode the received packet based on the determined redundancy rate, and
transmit, to the network entity, the encoded packet.

15. The proxy server of claim 14, wherein the controller is configured to: receieve the feedback information related to the transmission status from the base station or the AP, wherein the feedback information comprises information related to an encoding delay of the base station or the AP and determine a redundancy rate based on the encoding delay.

16. A transmission and reception apparatus for transmitting or receiving packets in a wireless communication system comprising:
a transceiver for transmitting or receiving at least one signal; and
a controller coupled with the transceiver and configured to:
receive, from a proxy server, a packet for a group of terminals encoded based on a first redundancy rate, the first redundancy rate for the group being determined based on a redundancy rate of the group,
receive channel status information from a terminal,
encode the received packet based on a second redundancy rate that is determined based on the channel status information and the first redundancy rate, and
transmit the packet, encoded based on the second redundancy rate, to the terminal,
wherein the group of terminals is grouped according to a redundancy rate of the terminals based on feedback information acquired from the terminals.

17. The transmission and reception apparatus of claim 16, wherein the controller is configured to: compare the first redundancy rate with a redundancy rate requested by the terminal; and
    determine the second redundancy rate based on the comparison.

18. A terminal for transmitting or receiving packets in a wireless communication system comprising:
    a transceiver for transmitting or receiving at least one signal; and
    a controller coupled with the transceiver and configured to:
    transmit channel status information to a network entity, the network entity including an access point (AP) or a base station and
    receive a packet encoded by the AP or the base station, from the AP or the base station,
    wherein the received packet is encoded in such a way that:
        a proxy server encodes the packet for a group of terminals based on a first redundancy rate for the group and transmits the encoded packet to the AP or the base station and the AP or the base station encodes the encoded packet on a second redundancy rate that is determined based on the channel status information and the first redundancy rate, the first redundancy rate being determined based on a redundancy rate of each group,
    wherein the group of terminals is grouped according to a redundancy rate of the terminals based on feedback information acquired from the terminals.

19. The terminal of claim 18, wherein the second redundancy rate is determined based on a result of comparing the first redundancy rate with a redundancy rate requested by the terminal, determined based on the channel status information.

20. The terminal of claim 18, wherein the first redundancy rate is determined based on encoding load of the AP.

* * * * *